United States Patent [19]

Fukushima et al.

[11] Patent Number: 5,465,111
[45] Date of Patent: Nov. 7, 1995

[54] METHOD AND APPARATUS FOR CORRECTING IMAGE FORMATION USING FUZZY LOGIC

[75] Inventors: Hisashi Fukushima, Kawasaki; Yoshio Uchikawa, Kitasakuma; Yoshito Mizoguchi, Kawasaki, all of Japan

[73] Assignee: Canon Kabushiki Kaisha, Tokyo, Japan

[21] Appl. No.: 898,200

[22] Filed: Jun. 12, 1992

[30] Foreign Application Priority Data

Jun. 14, 1991 [JP] Japan ........................ 3-142895
Jun. 26, 1991 [JP] Japan ........................ 3-154634

[51] Int. Cl.⁶ .................... G01D 15/06; G03G 21/00
[52] U.S. Cl. .................... 347/115; 347/117; 358/458; 358/521; 358/298; 395/900; 355/208
[58] Field of Search .................... 346/153.1, 108, 346/157; 355/208; 395/900; 358/521, 458, 298; 347/112, 129, 282, 240, 251

[56] References Cited

U.S. PATENT DOCUMENTS

| | | | |
|---|---|---|---|
| 4,800,422 | 1/1989 | Riseman et al. | 358/280 |
| 4,864,490 | 9/1989 | Nomoto et al. | 364/157 |
| 4,888,618 | 12/1989 | Ishikawa | 355/208 |
| 4,888,636 | 12/1989 | Abe | 358/80 |
| 4,899,216 | 2/1990 | Tatsumi et al. | 358/80 |
| 4,931,864 | 6/1990 | Kawamura et al. | 358/80 |
| 4,959,669 | 9/1990 | Haneda et al. | 346/157 |
| 5,016,097 | 5/1991 | Shimano | 358/79 |
| 5,023,708 | 6/1991 | Maruyama et al. | 346/157 X |
| 5,025,282 | 6/1991 | Nakamura et al. | 355/38 |
| 5,029,314 | 7/1991 | Katsumi et al. | 355/208 |
| 5,109,275 | 4/1992 | Naka et al. | 358/80 |
| 5,128,718 | 7/1992 | Mizoguchi | 355/208 |
| 5,142,332 | 8/1992 | Osawa et al. | 355/208 |
| 5,148,289 | 9/1992 | Nishiyama et al. | 358/300 |
| 5,179,634 | 1/1993 | Matsunaga et al. | 395/75 |
| 5,204,718 | 4/1993 | Morita | 355/246 |
| 5,220,373 | 6/1993 | Kanaya | 355/204 |
| 5,231,452 | 7/1993 | Murayama et al. | 355/208 |

FOREIGN PATENT DOCUMENTS

| | | |
|---|---|---|
| 0402143 | 12/1990 | European Pat. Off. . |
| 0415752 | 3/1991 | European Pat. Off. . |
| 0415754 | 3/1991 | European Pat. Off. . |
| 0469526 | 2/1992 | European Pat. Off. . |
| 63-177158 | 7/1988 | Japan . |

*Primary Examiner*—Peter S. Wong
*Assistant Examiner*—Randy W. Gibson
*Attorney, Agent, or Firm*—Fitzpatrick, Cella, Harper & Scinto

[57] ABSTRACT

An image forming apparatus for forming images on a recording medium on the basis of an electrophotography system includes a calculator for determining the quantities of state and quantities of control using fuzzy sets and for calculating, for each color, quantities of control. Each quantity of control corresponds to one of the detected quantities of state from a degree to which the quantity of state belongs to each fuzzy set. An extractor for extracting, in accordance with predetermined rules, a main quantity of control for each color in a specific position within the area represented by each quantity of control calculated by the calculator.

23 Claims, 27 Drawing Sheets

FIG. 16A
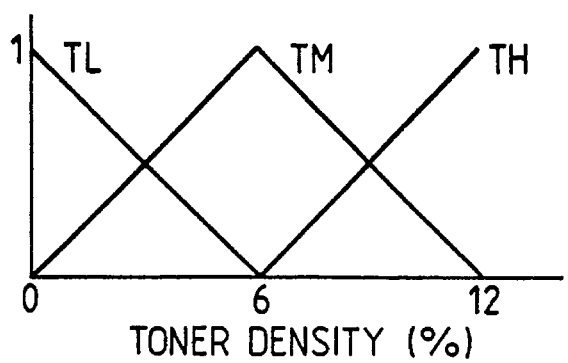
FIG. 16B
FIG. 16C
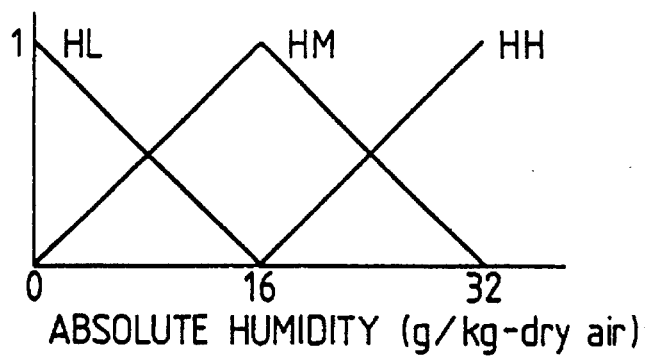
FIG. 17
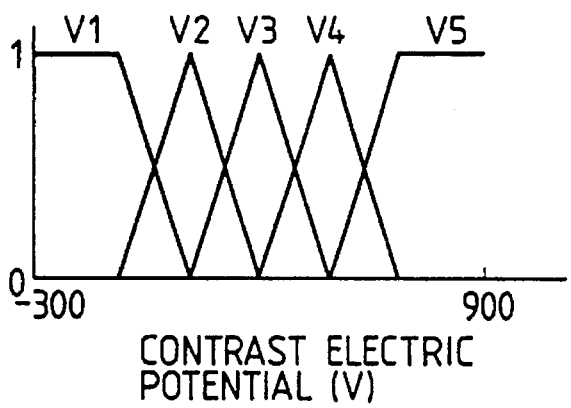

FIG. 24A
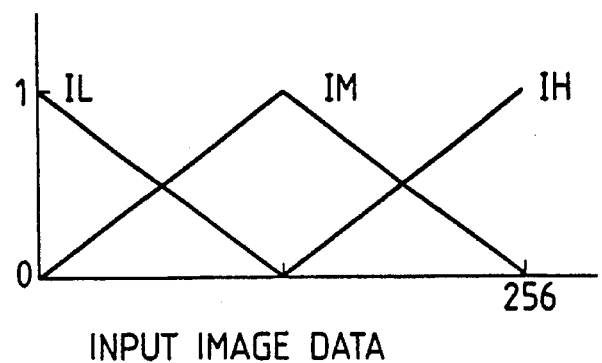
INPUT IMAGE DATA
FIG. 24B
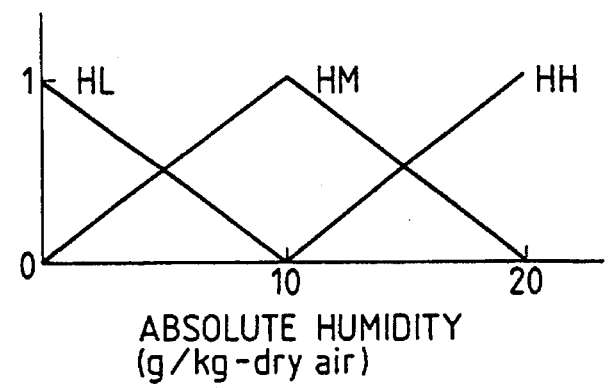
ABSOLUTE HUMIDITY
(g/kg-dry air)
FIG. 24C
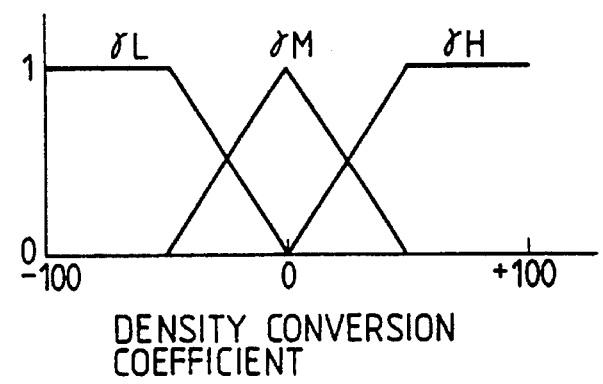
DENSITY CONVERSION
COEFFICIENT
FIG. 25
|    | IL  | IM  | IH  |
|----|-----|-----|-----|
| HL | γM  | γL  | γM  |
| HM | γM  | γM  | γM  |
| HH | γM  | γH  | γM  |

METHOD AND APPARATUS FOR CORRECTING IMAGE FORMATION USING FUZZY LOGIC

BACKGROUND OF THE INVENTION

1. Field of the Invention

The present invention relates to an image forming apparatus and more particularly to an image forming apparatus for recording input images on a recording medium and for outputting them.

2. Related Background Art

In an image forming apparatus for forming images using the electrophotography system, the control of image forming conditions such as development contrast electric potential, fogging prevention electric potential have been controlled by adjusting the charge electric potential of a photosensitive drum and developing bias electric potential to be applied to a developing device, and the like to keep the density of the images formed constant. Especially, in multi-color copiers, unless the image forming conditions are set in accordance with the characteristics of the developer for each color, the density will vary from color to color resulting in an image which can not be considered good as a whole. It is therefore indispensable to keep the density constant for each color component. However, there has been a problem that since the variation in image density due to changes in humidity is especially significant and the degree of the density variation resulting from the moisture absorption varies depending on the colors, i.e. types of developers, the difference in density is striking.

The methods being contemplated to cope with such a problem include a method wherein a sensor is provided for measuring environmental changes, i.e., humidity in the vicinity of a developing device to obtain the quantity of the moisture absorbed by the developing device, and image forming conditions are changed by a control means in accordance with the result detected by the sensor in a predetermined period of time and the type of the developer used, and a method wherein a control means is provided, which chronologically changes set image forming conditions on the basis of the quantity and direction of the change in the result detected by an environment detecting means in a unit period of time. However, in order to improve the accuracy of the control, the control must be performed with complicated and expensive apparatus which can be a problem.

Also, a number of means for representing half-tone images have been proposed. The applicant has proposed the pulse width modulation system as a method for improving contrast while maintaining high resolution with a relatively simple configuration (U.S. Pat. No. 4,800,442). According to this method, the formation of digital images using a laser beam printer or the like through the conversion of digital image signals into binary signals is carried out in a manner wherein the digital image signals are converted into analog signals to obtain the contrast for half-tone, and the analog signals are compared with periodic pattern signals such as triangular pulses to generate pulse-width-modulated binary signals which are used as signals for driving the laser beam source. FIG. 31 shows examples of the levels of the analog signals and triangular pulses and an example of the binary signal resulting from the pulse width modulation.

Thus, pulse width modulation on digital image signals provides both high resolution and high contrast at the same time. Of course, when it is attempted to reproduce contrast which is faithful to the original in the course of such conversion, corrections must be made in consideration of the input characteristics of the original-reading system or the output density characteristics of the printer.

FIG. 32 is a block diagram showing major parts of an image forming apparatus including a γ-correction (contrast correction) function utilizing said pulse width modulation system.

Optical image information reflected from an original (not shown) is converted into analog electric signals by a CCD 111. The analog electric signals output by the CCD 111 are amplified by an amplifier 112 to an appropriate level and are converted into digital signals by A/D converter 113. The digital signals are subjected to corrections performed by a contrast (γ) corrector 114 on variations in contrast occurring in areas such as the area between the input of images and the output of the images. In general, the use of a ROM or the like wherein contrast correction coefficients for the entire system are stored allows a particular input contrast signal to be converted into a contrast signal on which predetermined corrections have been made referring to a look-up table showing contrast correction coefficients at that time. Digital image signals thus corrected are re-converted into analog signals by a D/A converter 115 and are compared with triangular pulse signals obtained by a triangular pulse generating circuit 117. Reference numeral 116 represents a comparator for this purpose whose outputs ultimately become binary image signals which have been pulse-width-modulated depending on density. The binary image signals are output to a printer 118 and are used for controlling the switching on/off of a laser beam to output images in half-tone representation. That is, half-tone images are formed by controlling the emission period of a laser.

The major factors that determine γ-characteristics are input characteristics (i.e. the characteristics of the conversion into analog electric signals performed by the CCD 111) and output characteristics (i.e. the density characteristics of the formation of images to be utilimately recorded on the basis of the quantity of the pulse width modulation at the printer 118). The CCD 111 generally has characteristics such that it exhibits monotonous change relative to the quantity of light while the characteristics of the printer 118 vary depending on the types of the devices.

FIG. 33 shows examples of the input characteristics and the typical input/output characteristics in the case that an electrophotography type laser beam printer is used, along with an example of the γ-correction table in this case.

The density of the CCD 111 has the characteristics shown in the quadrant I in FIG. 33 relative to the density shown in the quadrant II. In order to obtain output characteristics faithful to input density, the value of the density input by the CCD 111 must be γ-corrected as shown in the quadrant III. Therefore, it will be understood that the correction table shown in the quadrant IV may be provided on the contrast (γ) corrector 114 shown in FIG. 32.

However, changes in the temperature and humidity in and around the printer result in changes in various characteristics such as latent image characteristics, developing characteristics and transfer characteristics. This causes the output characteristics shown in the quadrant III in FIG. 33 to change.

As a result, the output density relative to input density shown in the quadrant II changes. Consequently, the output image is formed in different ways from the same original depending on the changes in temperature and humidity.

In the proposal according to the application of the applicant, attempts have been made to cope with such a situation by, for example, employing a configuration wherein a temperature/humidity detecting means for detecting temperature and humidity is provided in the apparatus to correct the image data received by the main body of the image forming apparatus in accordance with the output signals from the temperature/humidity detecting means.

In the conventional configuration as described above, however, since the output image data corresponding to the input image data is developed into a table, an enormous amount of information is involved and, as a result, there is a tendency that a memory of large capacity is required.

Especially, when an electrophotography type laser beam printer as described above is used, there are factors affecting the printer conversion characteristics shown in the quadrant III in FIG. 33 other than the changes in the temperature and humidity in and around the printer as described above, the factors including the density of toner (or the quantity of the toner left) in the developing device, the number of sheets that the apparatus can endure, and the type of the transfer material used. Since a memory having a still larger capacity is required to cover all of these correction factors, a problem arises in that the apparatus inevitably becomes large and expensive.

In addition, alterations to the contents of a correction require the information in the table to be rewritten item by item. The labor for this tends to become more complicated as the amount of information increases.

SUMMARY OF THE INVENTION

It is an object of the present invention to provide an image forming apparatus wherein the problems in the prior art have been solved.

It is an aspect of the present invention to provide an image forming apparatus allowing the formation of images wherein good density balance is achieved while adjusting itself to environmental changes.

It is another aspect of the present invention to provide an image forming apparatus comprising a detection means for quantitatively detecting the state of devices relating to image formation, a control means for controlling the quantities of control for multi-color image formation of the electrophotography type, a calculation means for representing the quantities of state detected by said detection means and said quantities of control using fuzzy sets and for calculating quantities of control each corresponding to one of the detected quantities of state from the degree to which the quantity of state belongs to each set, and an extraction means for extracting, in accordance with predetermined rules, the main quantity of control for each color in a specific position within the area represented by each quantity of control calculated by said calculation means.

With such a configuration, the degree to which each quantity of state detected by the detection means belongs to each fuzzy set is obtained, and quantities of control each of which is based on each degree, are obtained. The quantity of control for each color in a specific position within the area represented by each quantity of control calculated by said calculation means is obtained. In accordance with the quantities of control thus obtained, the control means controls the image formation in each color, thereby providing an image having good color balance.

It is still another aspect of the present invention to provide an image forming apparatus which controls the signal processing conditions for image signal processing using fuzzy inference using the processing conditions for an image formation processing means performing image formation as the quantities of state.

Such a configuration allows the variation in the image formation process conditions to be corrected, thereby allowing delicate density control.

It is still another aspect of the present invention to provide an image forming apparatus having an image-carrying element, a means for forming a latent image on said image-carrying element, a developing means for developing the latent image formed on said image-carrying element, and a toner image processing means for performing a process of transferring the image formed on said image-carrying element onto a transfer material. Alternatively, it is an object of the present invention to provide an image forming apparatus having a single or a plurality of image-carrying elements, a means for forming latent images on said image-carrying elements, a plurality of developing means for developing the latent images formed on said image-carrying elements, and a transfer means for transferring the images formed on said image-carrying element onto a transfer material held on a dielectric sheet in a manner wherein the images are sequentially overlaid in an electrical field, said means for forming latent images comprising a data input portion for inputting image data, a correction means for correcting the input image data, a quantity-of-state detection means for detecting at least one quantity of state for controlling said correction means, a rule storing means for establishing a relationship between said quantity of state and a quantity of control of said correction means as at least one qualitative rule, a function storing means for representing said quantity of state and quantity of control using at least one fuzzy set, an inference means for calculating the degree to which said quantity of control belongs to said fuzzy set from the degree to which said quantity of state belongs to said fuzzy set and for inferring the quantity of control having the highest probability on the basis of the result of the calculation, and a means for controlling said correction means on the basis of the result obtained by said inference means.

According to the present invention, the output image data corresponding to input image data is taken as quantities of control for quantities of state such as the temperature and humidity of the atmosphere wherein the apparatus is installed; the quantities of control are calculated on the basis of the quantities of state using the so-called fuzzy inference; and the output image data corresponding to the input image data is corrected on the basis of the quantities of control thus obtained.

The above and other objects of the present invention will be apparent from the accompanying drawings and following detailed description.

BRIEF DESCRIPTION OF THE DRAWINGS

FIGS. 16A to 16C show the membership function of toner density in FIG. 16A, the membership function of the absolute humidity in FIG. 16B, and the membership function of contrast electric potential in FIG. 16C;

FIG. 17 illustrates examples of fuzzy rules;

FIGS. 24A to 24C illustrate an example of the procedure for determining density conversion coefficients using fuzzy inference;

FIG. 25 illustrates examples of fuzzy rules;

DESCRIPTION OF THE PREFERRED EMBODIMENTS

Preferred embodiments of the present invention will now be described with reference to the accompanying drawings.

EMBODIMENT 1

Figure 1:
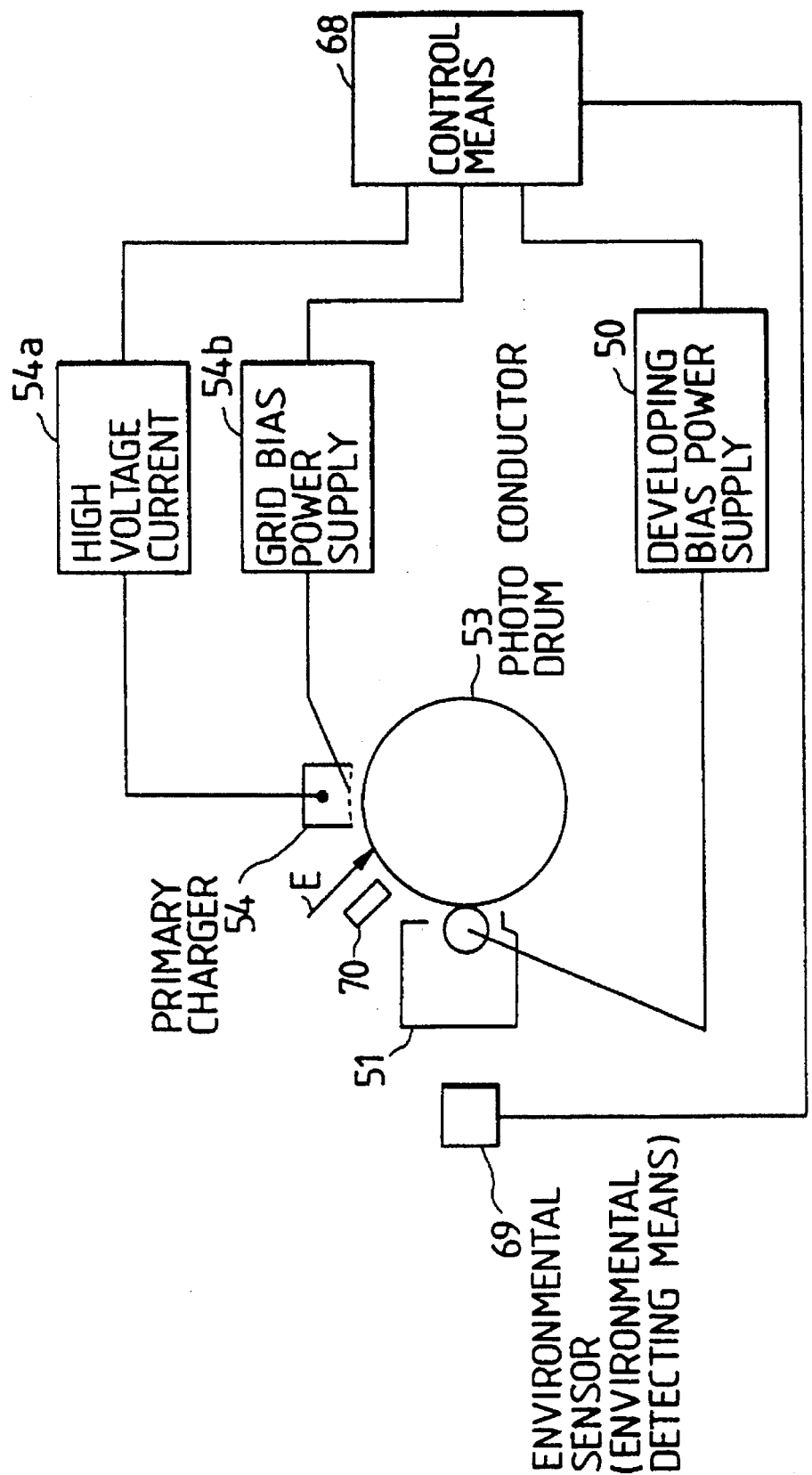
FIG. 1 is a block diagram of an image forming apparatus of a first embodiment of the present invention.
Figure 2:
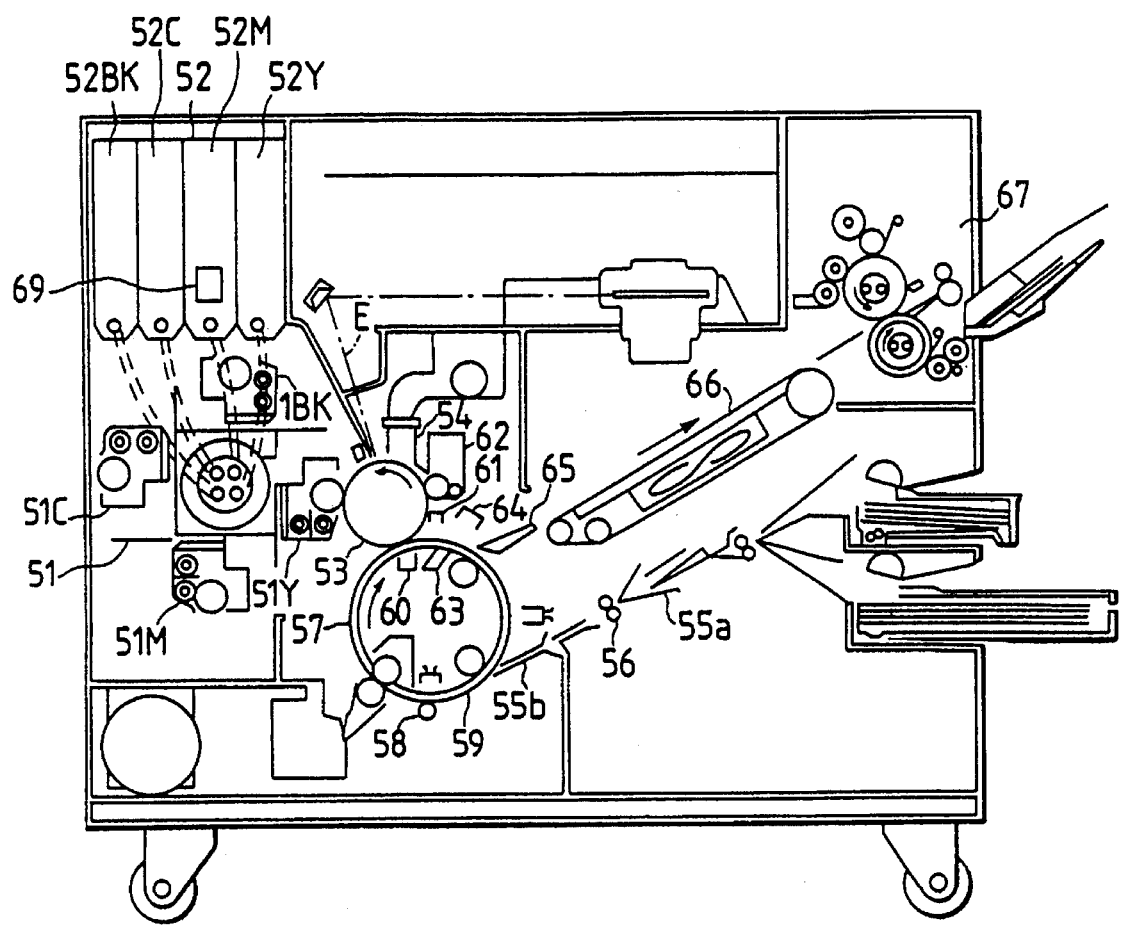
FIG. 2 is a sectional view of the image forming apparatus of the embodiment.

FIG. 1 is a block diagram of an image forming apparatus of an embodiment of the present invention. FIG. 2 is a sectional view of the present apparatus.

In FIG. 2, reference numeral 51 represents a rotary developing device having a yellow-developing unit 51Y, a magenta-developing unit 51M, a cyan-developing unit 51C, and a black-developing unit 51BK. Reference numeral 52 represents a device for supplying the developer (toner) to the developing device 51 having a yellow-hopper 52Y, a magenta-hopper 52M, a cyan-hopper 52C, and a black-hopper 52BK.

The operation of a full-color image forming process of this apparatus will now be described while other configurations will be described later.

A photosensitive drum 53 rotating in the direction indicated by the arrow at a constant speed has a charger 54 thereon to be uniformly charged on the surface thereof. Next, image exposure is carried out with a laser beam E modulated by a yellow image signal of an original (not shown), and an electrostatic latent image is formed on the photosensitive drum 53. Thereafter, development is carried out by the yellow-developing unit 51Y which has been preset in a developing position.

A transfer paper which has been transported via a paper feeding guide 55a, paper feeding rollers 56, a paper feeding guide 55b, is held by a gripper 57 in synchronism with predetermined timing and is electrostatically wound around a transfer drum 59 by a contact roller 58 and a pole opposing thereto. The transfer drum 59 rotates in the direction indicated by the arrow in synchronism with the photosensitive drum 53, and the image which has been developed by the yellow-developing unit 51Y is transferred by a transfer charger 60 at a transfer portion. The transfer drum 59 keeps rotating to prepare for the transfer of a next color (magenta in FIG. 1).

On the other hand, the photosensitive drum 53 is discharged by a charger 61 and the residual toner on the surface thereof is removed (cleaned) by a cleaning member 62. It is charged by the charger 54 again and exposed by a magenta image signal in the same manner as previously described. Meanwhile, the developing device 51 rotates to bring the magenta-developing unit 51M into contact with the photosensitive drum 53. Subsequently, the same process is repeated for cyan and black. When the transfer is complete for the four colors, the four-color image on the transfer paper is discharged by chargers 63 and 64. Said gripper 57 is released and the paper is separated from the transfer drum 59 by a separating nail 65. The paper is then transported to a fixing unit 67 by a transporting belt 66. Thus the series of full-color printing operations is complete and a full-color print image is formed.

In the present embodiment, a humidity sensor 69 is provided, in addition to the above-described configuration, preferably in a position where the moisture absorption of the toner is well reflected such as a position in the vicinity of the toner hoppers or developing units.

In FIG. 1, 54a represents a high voltage power supply for feeding the primary charger 54; 54b represents a grid bias power supply which is provided at the primary charger 54 and feeds a grid for controlling the quantity of the electric charge supplied to the photosensitive drum to a desired value; 50 represents a power supply for feeding the developing units with a developing bias which is obtained by superimposing a DC component on a predetermined AC waveform; and 68 represents a control means such as a microcomputer for controlling the output values of those power supplies. Further, connected to the control means 68 are an environmental sensor as a humidity sensor 69 and an electric potential sensor 70 for detecting the surface electric potential of the photosensitive drum 53.

The operation of the present embodiment will now be described.

Figure 3:
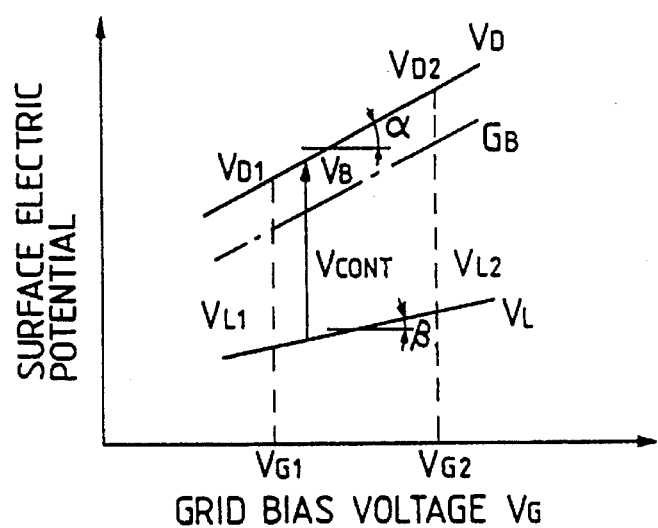
FIG. 3 illustrates the relationship between a grid voltage and the surface voltage of a photosensitive drum where light is directed and where light is not directed.

FIG. 3 is a graph showing the relationship between a grid bids voltage (abscissa) and the surface electric potential of the photosensitive drum (ordinate). In the figure, VD corresponds to the surface electric potential where the surface is not irradiated, and VL corresponds to the surface electric potential where the surface is irradiated. In this figure, the surface VD, i.e., the electric charge quantity is proportional to a grid vias V6 if it is observed in a limited range (operating range). Although the surface electric potential VL after the irradiation has the same tendency, the degree of the change in VD relative to the quantity of the change in the grid bias V6, i.e., the proportion coefficient, is greater than that of VL ($\alpha>\beta$). Then, prior to a printing sequence, the control means 68 measures VD and VL against preset grid voltages VG1 and VG2 with an electric potential sensor 70 and assumes the charging curves of VD and VL relative to the change in grid voltage as shown in FIG. 3 on the basis of the data measured. Thereafter, when image formation is actually performed, calculation is carried out on the basis of the charging curves obtained through the above-described operation to obtain a grid voltage such that image contrast, i.e., the difference between the DC component in a developing bias to be described later and the surface electric potential VL (or VD–VL) equals a predetermined value. The grid bias power source 54b is thus controlled to provide such a grid voltage. Further, the developing bias power supply 50 is controlled by obtaining a developing bias having a value (VB) which is lower than VD by a predetermined electric potential so that the toner will not adhere to the areas corresponding to the white background of the image, i.e., the areas corresponding to VD in the present embodiment wherein reversal development is carried out.

Figure 4A:
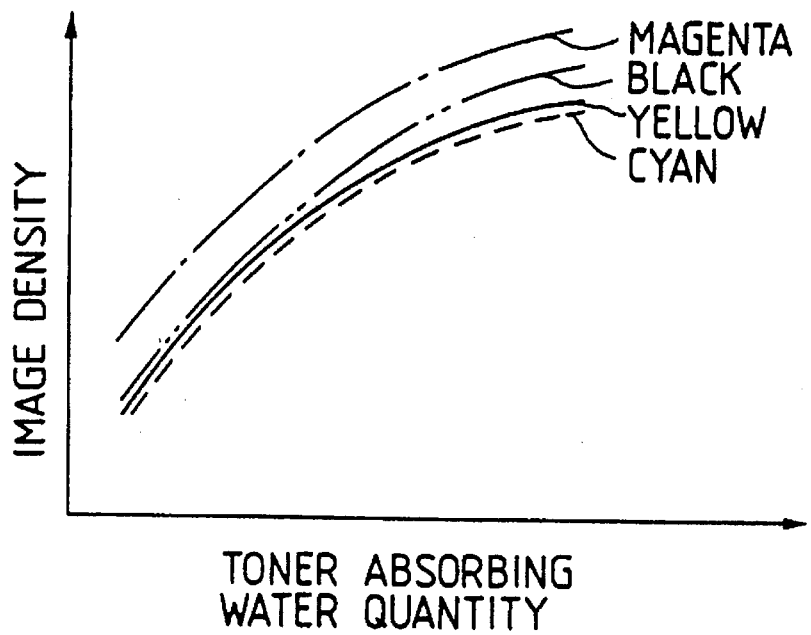
FIGS. 4A and 4B illustrate the relationship between the quantity of the moisture absorbed by the toner and image density for each color component and the relationship between the quantity of the moisture absorbed by the toner and the optimum contrast voltage.
Figure 4B:
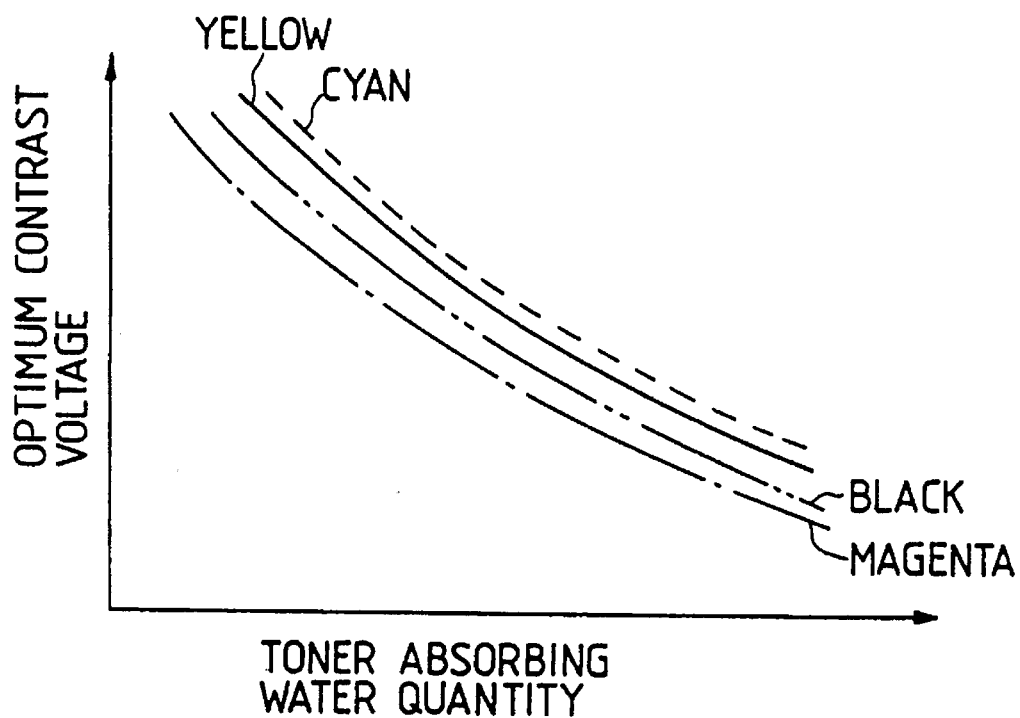

First, the quantity of the moisture absorbed by the toner is defined to be represented by percentage by weight, i.e., the ratio of the quantity of the moisture to the weight of the toner. FIG. 4A shows the correlation between the quantity of the moisture absorbed by the toner and image density for each color component when printing is performed under the same image forming conditions. As shown in FIG. 4A, under the same image forming conditions, the smaller the quantity of the moisture absorbed by the toner, the lower the density, and the larger the quantity of the moisture absorbed by the toner, the higher the density. Therefore, if the quantity of the moisture absorbed by the toner is detected and image forming conditions are set on the basis of the value of the contrast voltage VCONT corresponding to the quantity detected, it is possible to obtain stable images regardless of changes in environmental conditions. FIG. 4B illustrates the change in the optimum contrast voltage that provides stable images relative to the change in the quantity of the moisture absorbed by the toner. Since the correlation between the quantity of the moisture absorbed by the toner and image density varies depending on the colors, image forming conditions may be varied depending on the colors to correct variations in image density due to the difference in the color of the developer. The assumption of the quantity of the moisture absorbed by the toner allows the calculation of the optimum contrast voltage. In the present embodiment, the control of contrast is carried out by assuming the quantity of the moisture absorbed by the toner on the basis of humidity and the time spent in the humidity. As the quantities of state to be used for the control, the change in the humidity in the apparatus and the time elapsed after the change are used. The change in the contrast voltage is used as the quantities of control.

Figure 5A:
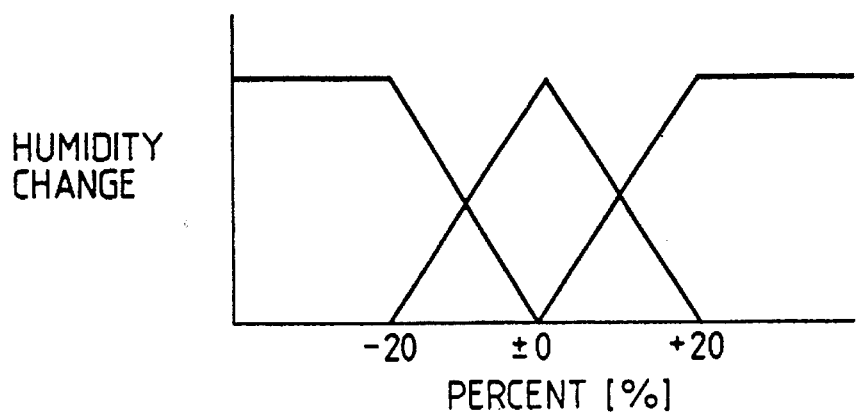
FIGS. 5A to 5C illustrate a fuzzy set of membership functions.
Figure 5B:
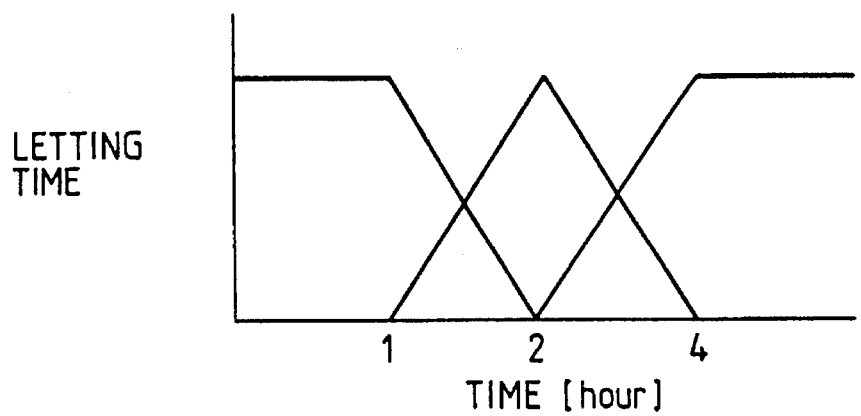
Figure 5C:
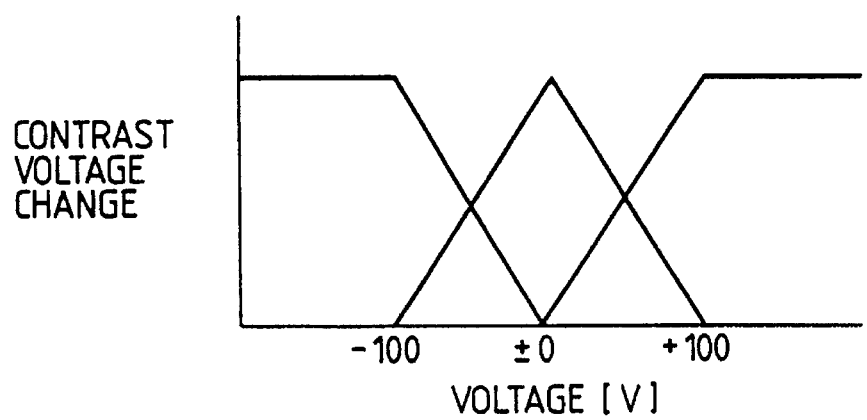

FIGS. 5A, 5B and 5C are diagrams showing membership functions for defining fuzzy sets for each of the quantities of state and quantities of control. These membership functions are preset. Specifically, the changes in humidity, time spent in the humidity, and contrast voltage is divided by three membership functions into three fuzzy sets. The time spent in the humidity is measured by a counter (not shown) in the apparatus.

Next, a description will be made on a method of calculating the change in the optimum contrast voltage in accordance with the change in humidity and the time spent in the humidity using the fuzzy set of the quantities of state of the time spent in the humidity and the fuzzy set of the contrast voltage as the quantities of control.

In determining the change in the contrast voltage, the following fuzzy rules are used.

Rule 1 if the change in humidity=HL and the time spent in the humidity=TH, then the change in the contrast voltage=VL Rule 2 if the change in humidity=HM and the time spent in the humidity=TH, then, the change in the contrast voltage=VM Thus, the fuzzy rules are set as needed. The fuzzy rules in this case are summarized in the following table (Table 1). In the table HL, HM and IIH represent he fuzzy sets of the change in the humidity; and VL, VM and VH represent the fuzzy sets of the change in the contrast voltage. The right hand side letters L, M and H of the signs of the fuzzy sets indicate the degrees of the respective factors. L represents a low degree; M represents a medium degree; and H represents a high degree.

[TABLE 1]

|  | HUMIDITY | | |
| --- | --- | --- | --- |
|  | HL | HM | IIH |
| TIME SPENT IN THE HUMIDITY | | | |
| TL | VM | VM | VM |
| TM | VM | VM | VH |
| TH | VL | VM | VH |

FIGS. 6A to 6G illustrate an example of the calculating of the change in contrast voltage on the basis of fuzzy inference using the above-described [rule 1] and [rule 2].

For example, assume that the change in humidity=x and the time spent in the humidity=y.

Figure 6A:
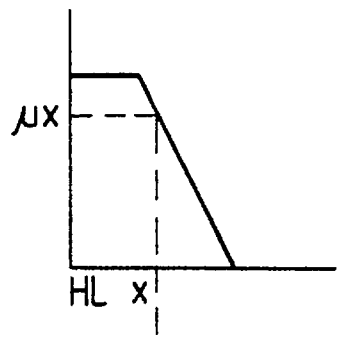
FIGS. 6A to 6G are views for explaining the method of calculating variations in the optimum contrast voltage on the basis of fuzzy inference.
Figure 6B:
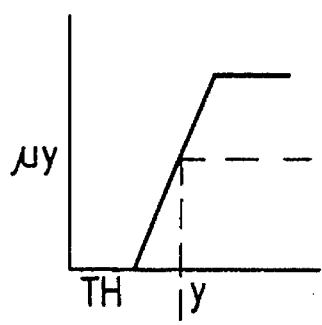
Figure 6C:
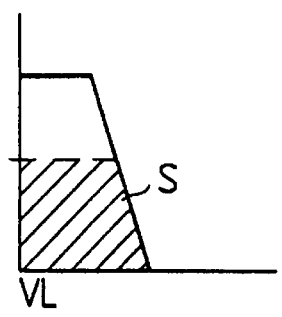
Figure 6D:
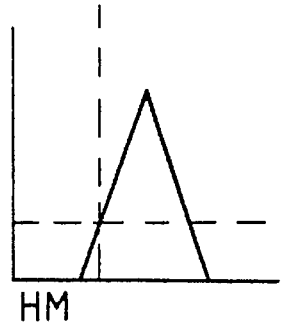
Figure 6E:
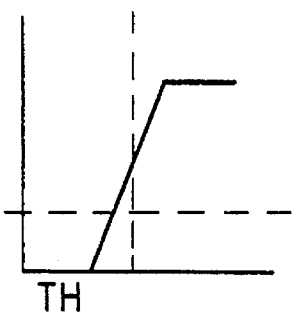

First, according to [rule 1], the input x is put in the set HL in the ratio of ux as shown in FIG. 6A by the membership function for the change in humidity shown in FIG. 5A. On the other hand, the input y is put in the set TH in the ratio of uy as shown in FIG. 6B by the membership function for the time spent in the humidity as shown in FIG. 5B. Thereafter, the minimum values of ux and uy are obtained and those values are taken as the degrees that satisfy the conditional part of [rule 1]. A minimum value operation is performed on these values and the membership function for the change in contrast voltage as shown in FIG. 5C to obtain the trapezoid S indicated by the oblique lines in FIG. 6C.

Figure 6F:
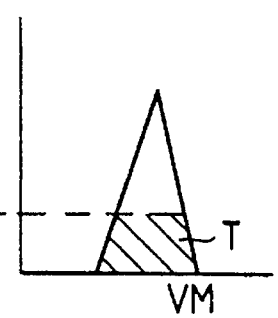
Figure 6G:
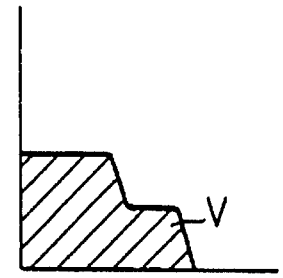

Similar calculation is also carried out in the case of [rule 2] to obtain the trapezoid T indicated by the oblique lines in FIG. 6F. A maximum operation is performed on the two trapezoids S and T to obtain a new fuzzy set U indicated by the shaded portion U. A value obtained as the center of gravity, i.e., the representative value of the fuzzy set U is taken as the change in contrast voltage [V] obtained through fuzzy inference.

Returning to the control means 68 in the present invention, it is constituted by a microcomputer or the like. In the ROM (not shown) in which the programs executed by the control means is stored, information for carrying out the processes associated with FIG. 3 to FIGS. 5A to 5C and Table 1 is stored as a table or calculation program.

As described above, in the image forming apparatus for forming images by developing latent images with a developing means having developers according to the present embodiment, the quantities for inferring the characteristics of the developers, and the control is performed by inferring the optimum quantities of control for image forming conditions from the quantities of state using fuzzy rules. As a result, highly accurate control can be performed with a simple configuration. Thus, stable image density and color balance can be insured even when the external environment changes.

Although the change in contrast voltage is used as the quantities of control in the above-described embodiment, this is not limiting the present invention in light of the phylosophy behind the present invention. For example, a charging electrode having a voltage controlling means may be provided in each developing unit to control the charging electric potential for the developer. Further, a means for measuring the ratio of the toner to the carrier during development and a means for controlling the quantity of the toner supplied may be provided to control the toner/carrier ratio during development. The change in humidity and the time spent in the humidity are used as the quantities of state in this case again. Needless to say, the quantities of state may be otherwise selected.

Further, the change in humidity and the time spent in the humidity are used as the quantities of state in the present invention, the present invention is not limited thereto. It is possible to employ the contrast voltage controlling method at disclosed in U.S. Pat. No. 4,888,618 wherein the average humidity in unit time is used as the quantity of state. Alternatively, the toner/carrier ratio of developer may be used as the quantity of state. Image forming conditions may be controlled by determining the quantity of control in accordance with such quantities of state using fuzzy rules.

As described above, it is possible to form images having good density balance while adapting to environmental changes with a simple configuration.

EMBODIMENT 2

A. Main Body

Figure 7:
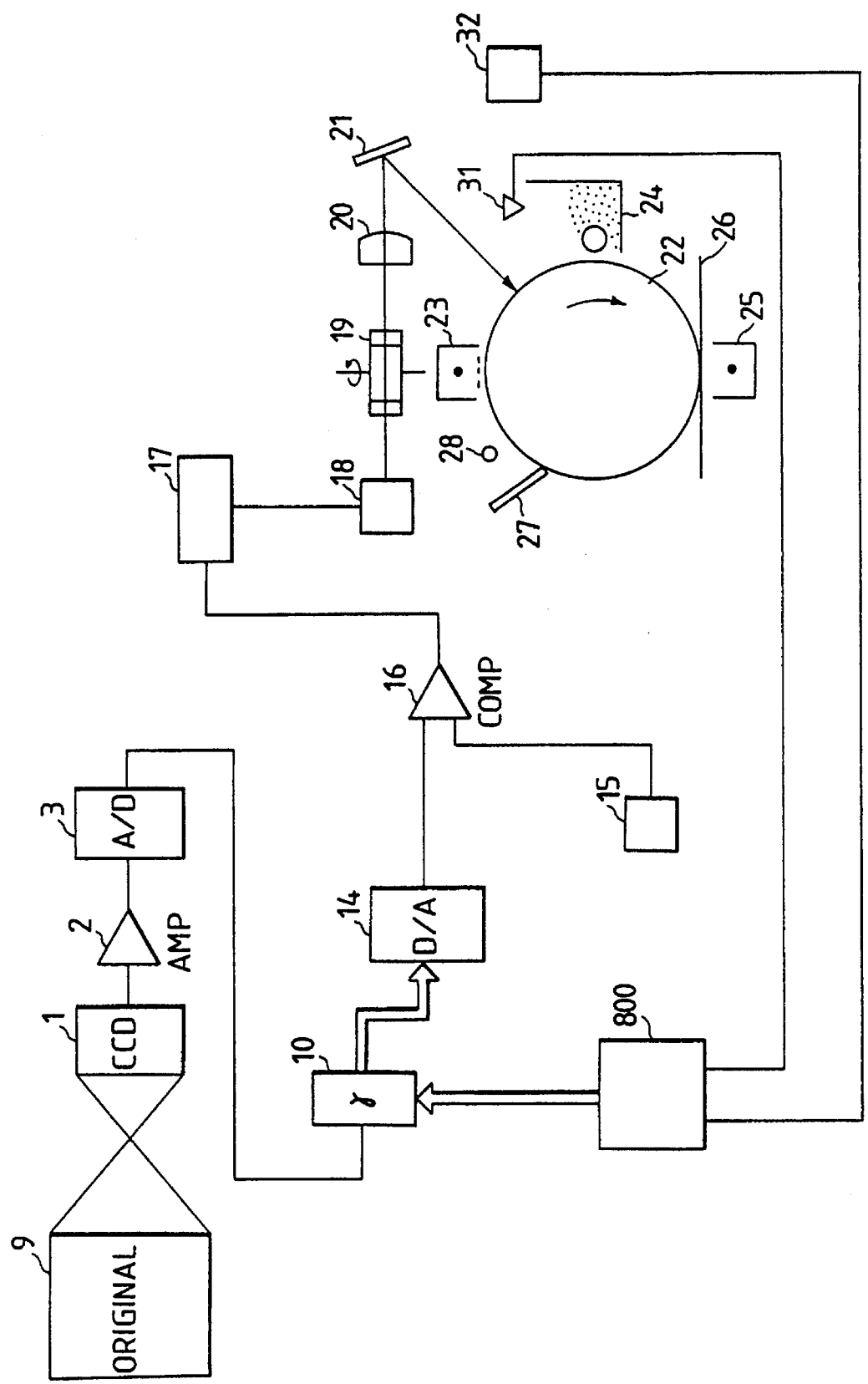
FIG. 7 is a block diagram of an image forming apparatus of a second embodiment of the present invention.

FIG. 7 is a block diagram showing a second embodiment of an image forming apparatus of the present invention. In this embodiment, a description will be made on the application of the present invention to a laser beam printer, i.e., formation of images carried out by scanning a laser beam on a photosensitive drum in synchronism with the read in of an original document.

First, an original document 9 is read in by a CCD 1. The analog image signals thus obtained are amplified by an amplifier 2 to a predetermined level and are converted into 8-bit digital image signals (0 to 255 contrasts) by an A-D converter 3. Next, the digital image signals pass a $\gamma$-converter 10 (a table constituted by a 256-byte RAM).

A $\gamma$-correction value (hereinafter designated by $\gamma'$) stored in the $\gamma$-converter 10 has been corrected by a $\gamma$-control device 800.

The digital image signals are passed through the $\gamma$-converter 10, $\gamma$-corrected and input to a D-A converter 14 to be re-converted into analog signals. The analog signals are compared with signals having predetermined periods generated by a triangular pulse generating circuit 15 by a comparator 16 to be pulse-width-modulated. The pulse-width-modulated binary image signals are input as they are to a laser driving circuit 17 and are used as signals for controlling switching on/off of a laser diode 18.

The laser beam emitted from the laser diode 18 is scanned in the main scanning direction with a polygon mirror of a well known type and is directed through an f/θ lens 20 and a reflecting mirror 21 to a photosensitive drum 22 rotating in the direction indicated by the arrow to form an electrostatic latent image.

The photosensitive drum 28 is uniformly discharged by an exposing device 28 and, thereafter, it is uniformly negatively-charged by a charger 23. Then, it receives the above-described laser beam to form a latent image on the surface thereof in accordance with the image signals. Since the present embodiment utilizes the so-called image scan system wherein the areas to be developed (black pixels) are exposed, a developing unit 24 applies the toner having negative charge characteristics to the discharged areas of the photosensitive drum 22 to develop the areas. The image (toner image having negative charge) formed on the photosensitive drum 22 is transferred to a transfer material (a paper, in general) 26 by a transfer charger 25. Then, the residual toner on the photosensitive drum 22 is scratched off by a cleaner 27. Thereafter, the above-described series of processes is repeated.

B. Control Device (800)

Figure 8:
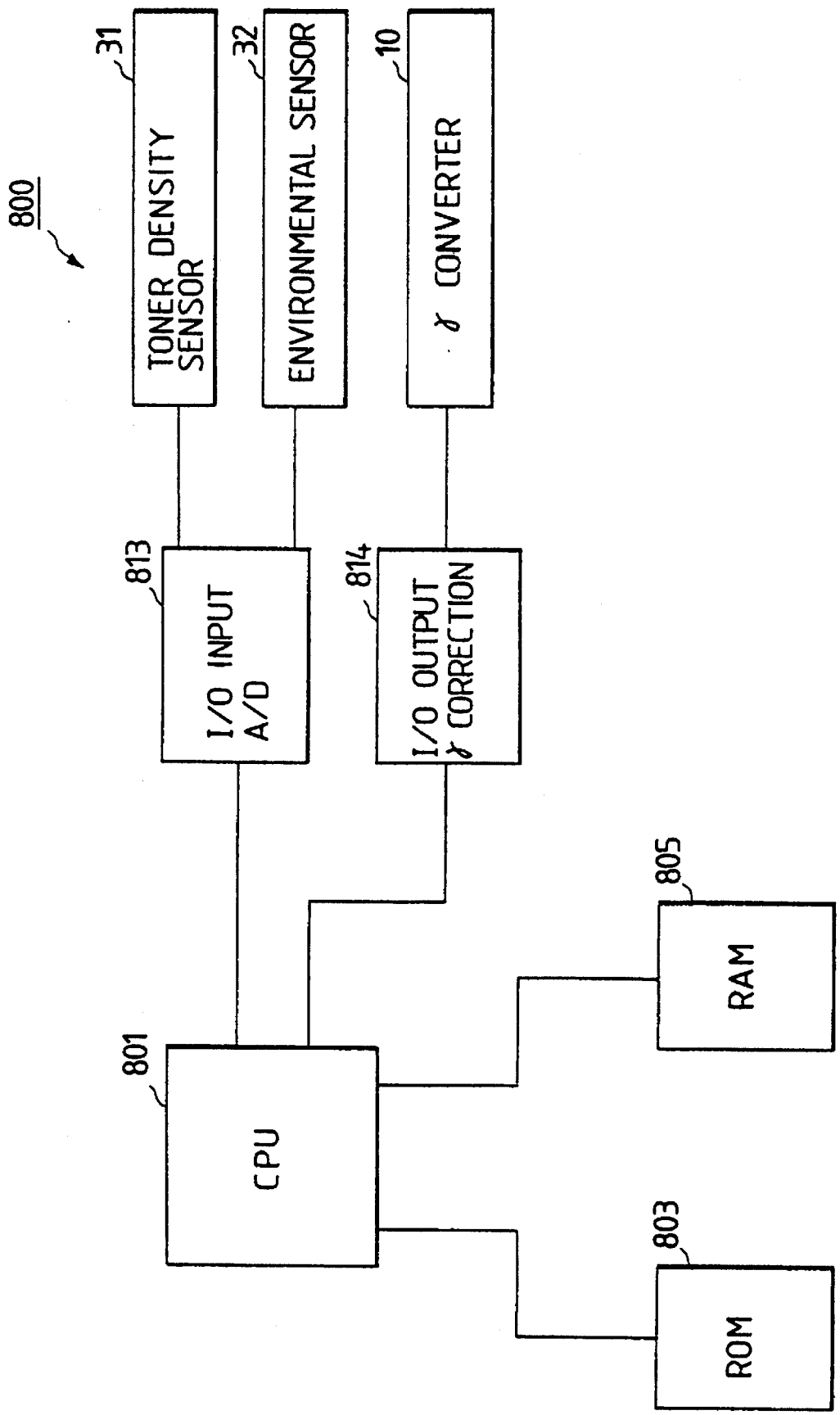
FIG. 8 is a block diagram of a γ-control device.

FIG. 8 shows an example of the configuration of a $\gamma$-control device 800. In FIG. 8, 801 represents a central processing unit (CPU) for performing arithmetic control for executing the present invention constituted, for example, by a 16-bit microcomputer. 803 represents a read only memory (ROM) wherein the control procedures (control programs) according to the present embodiment are stored in advance. The CPU 801 controls various constituent devices in accordance with the control procedures stored in the ROM 803. Reference numeral 805 represents a random access memory (RAM) which is the main memory to be used for storing input data and as a working memory area.

Reference numeral 814 represents an output signal transfer interface (I/O) for outputting the control signals of the CPU 801 to the γ-converter 10. Reference numeral 813 represents an input signal transfer interface (I/O) which receives input signals from a toner density sensor 31 for detecting the quantity of the toner remaining in the developing unit 24, an environmental sensor 32 for detecting the quantity of the environment wherein the apparatus is installed, the absolute quantity of the moisture included in the air, in this case, and the like and which sends the input signals to the CPU 801. Interfaces 813 and utilize 814, input/output circuit support μPD8255 to communicate.

C. Example of Normal Operation

An example of the operation of the image forming apparatus according to the present invention will now be described. As specific examples of the quantities of state to be used for control, the following the four quantities of state are used.

(1) the quantity of the toner remaining in the developing unit (the density of the toner in the developing unit)

(2) the quantity of the environmental state (the absolute quantity of the moisture in the air, in this case)

(3) the number of sheets that the apparatus can endure (4) the type of the transfer material used As a specific example of the quantity of control to be used for control, (5) γ-conversion coefficient is used.

The relationship between the quantities (1)–(4) and the characteristics of the printer will now be described. The quantity of the toner remaining in the developing unit per item (1) will be described using the well-known-2-component magentic brush developing system as an example. In general, as the quantity of the toner remaining in the developing unit decreases, the developing capability of the developing unit is deteriorated. The reasons are that the absolute quantity of the toner that the carrier particles can retain decreases and that the quantity of the charge pressed by the toner particles increases too much deteriorating the development in the direction of the drum because the frictional electrification between the toner particles and the carrier develops in excess of the quantity needed.

Figure 9A:
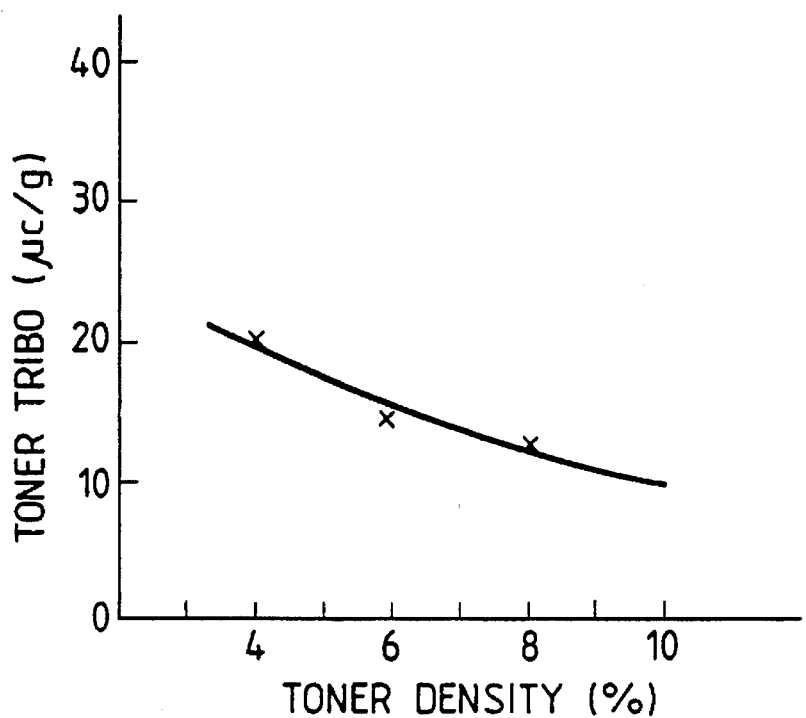
FIGS. 9A and 9B illustrate the relationship between toner density and toner tribo and the relationship between toner density and image density.

FIG. 9A illustrates the relationship between toner density (w) and the quantity of the charge relative to the toner (the average quantity of the charge possessed by 1 g of toner which is referred to as "tribo" hereinafter). The toner density (w) as used here means the percentage by weight of the toner in the developing unit and is expressed by the following formula.

$$w = \frac{M_T}{M_T + m_c} \times 100(\%) \quad (1)$$

where $M_T$ represents the total mass of the toner particles and $m_c$ represents the total mass of the carrier particles.

Figure 9B:
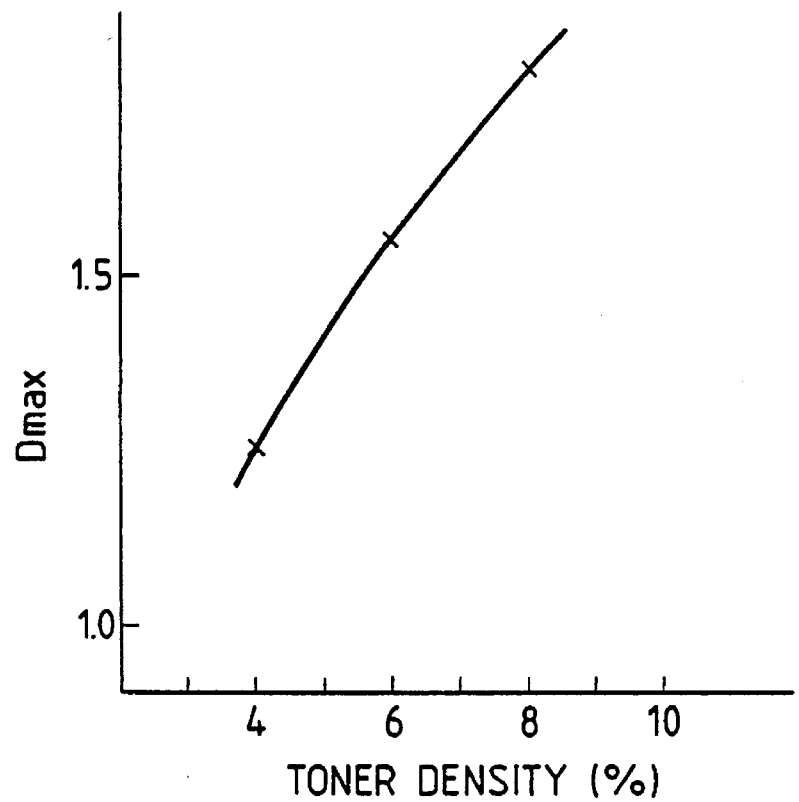

FIG. 9B illustrates the relationship between toner density and the image density at a $V_D$ portion (hereinafter indicated by "$D_{max}$"). $V_D$ represents dark area electric potential which is the surface electric potential of the photosensitive drum irradiated by the laser.

Figure 10:
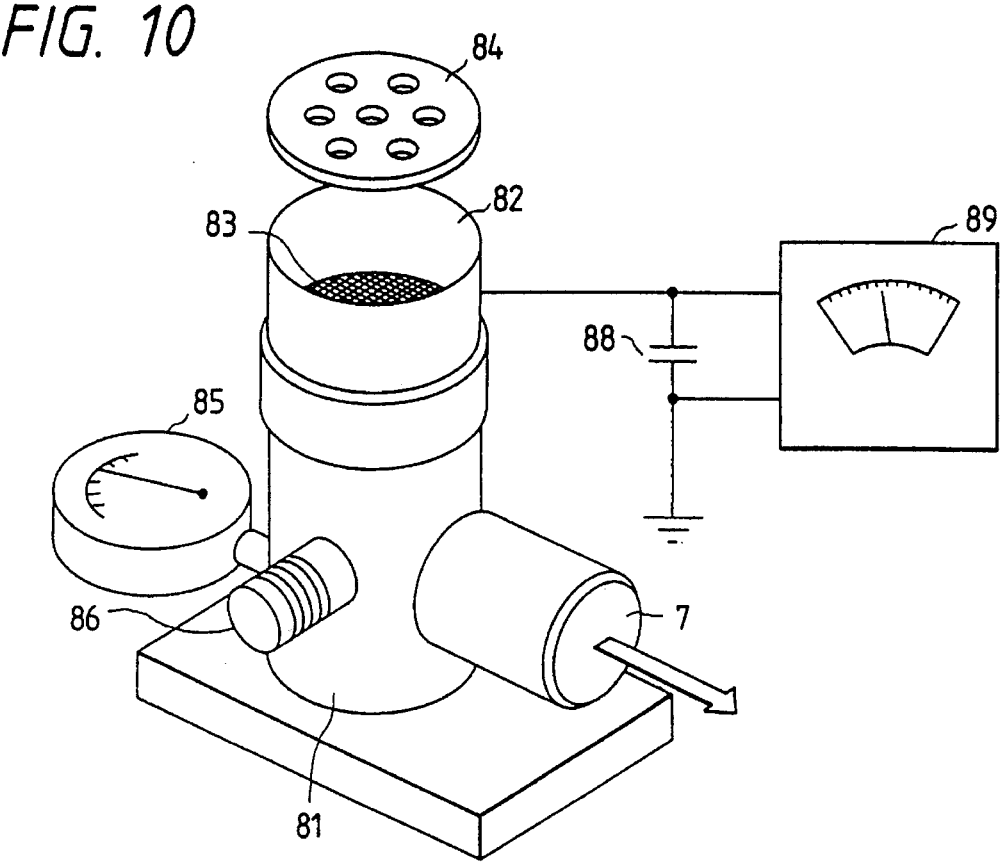
FIG. 10 is a perspective view of a toner tribo measuring device.

Said toner tribo is a value obtained by a toner tribo measuring device as shown in FIG. 10. The method of measurement thereof will be described.

First, the non-magnetic toner and carrier of iron powder (200–300 meshes) to be measured are put in a polybin of 50 cc and agitated for 20 seconds by shaking (about 100 times). About 1 g of the resulting mixture is put in a metalic measurement container 82 having a screen 83 of 400 meshes on the bottom thereof, and a metalic cap 84 having a hole for allowing passage of air is put. The measurement container 82 is placed on an absorber 81 whose portion in contact with the container is made of an insulator. Then, suction is applied through a suction port 87 so that the pressure reading of a vacuum gage 85 becomes 250 mmHgO and is continued until the electric potential across a capacitor 88 is saturated. If the saturated electric potential is represented by C and the weight of the toner removed by the suction is represented by M, the quantity of the charge at the toner (tribo) is calculated as follows.

$$Q(\mu c/g) = \frac{C \times V}{M} \quad (2)$$

The above data has been obtained in an environment of a room temperature of 23° C. and a relative humidity of 60%.

For the reasons as described above, when the density of the toner in the developing unit has decreased below a level which is normally set, correction is needed such that higher density will be output.

Figure 11:
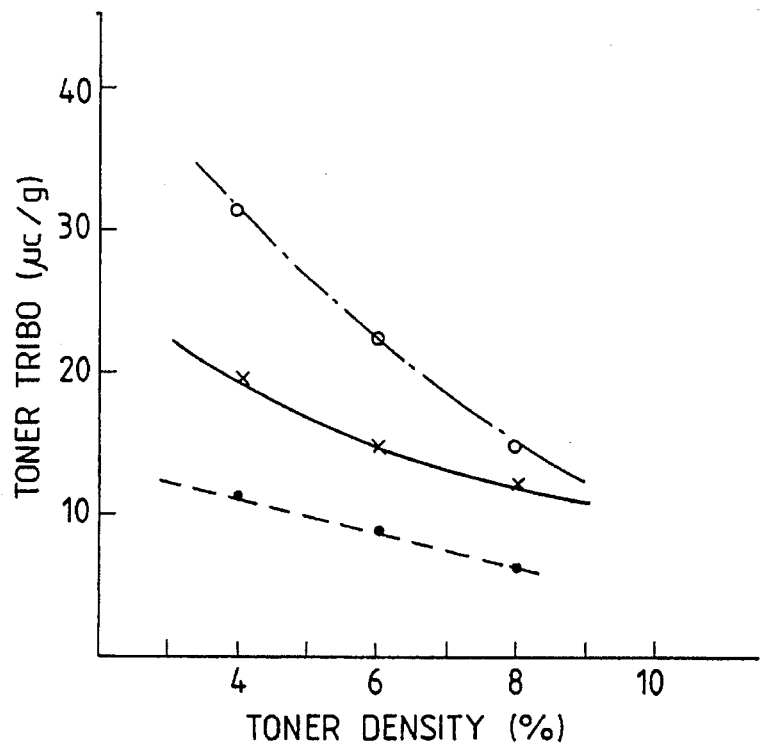
FIG. 11 illustrates the relationship between toner density and toner tribo.

The contribution of the absolute quantity of the moisture per item (2) is made especially through the change in the physical properties of the toner. Specifically, in a high humidity, the resistance of toner particles decreases due to the moisture in the air. As a result, sufficient frictional electrification does not take place between toner particles and carrier particles. This causes the toner tribo of toner particles to vary depending on environmental conditions, making a large contribution to the development of toner particles in the direction of the drum. FIG. 11 show how toner tribo is dependent on environment. In FIG. 11, the dotted line indicates the relationship between toner density and toner tribo in an environment of a room temperature of 32.5° C. and a relative humidity of 85% (therefore, the absolute quantity of the moisture in the air is 26.6 g/Kg-dry air); the solid line indicates the relationship between toner density and toner tribo in an environment of a room temperature of 23° C. and a relative humidity of 60% (therefore, the absolute quantity of the moisture in the air is 10.5 g/Kg-dry air); and the chain line indicates the relationship between toner density and toner tribo in an environment of a room temperature of 15° C. and a relative humidity of 10% (therefore, the absolute quantity of the moisture in the air is 1.1 g/Kg-dry air). For this reason, it is necessary to make a correction in accordance with the absolute quantity of moisture in the air.

Concerning the number of sheet the apparatus can endure, deterioration proceeds at the members of each process station as the use of the apparatus proceeds, collectively deteriorating the density. Therefore, the greater the number of sheets that the apparatus can endure, the greater the need for correction to increase the density. The number of sheets that the apparatus can endure can be detected by providing the apparatus with a counter capable of detecting the total number of the sheets that have passed.

Further, concerning the type of the transfer material, the thickness and volume resistivity of the transfer material have influence. Specifically, the thicker the transfer material or the greater the volume resistivity, the lower the efficiency of the transfer of toner images onto the transfer material. Therefore, the thicker the transfer material or the greater the volume resistivity, the greater the need for correction to increase the density output. As a means for detecting the thickness and volume resistivity of the transfer material, a thickness gage or volume resistivity meter of any well-known configuration is provided on the way of the transportation of the transfer material to a transfer station.

In the present embodiment, a description will be made on a system wherein the input quantities of state are (1) the quantity of the toner remaining in the developing unit (the density of the toner in the developing unit) and (2) the absolute quantity of the moisture in the air and wherein the output quantity of control is γ-conversion coefficient. The means for detecting the input quantities of state has a well-known configuration. The input quantities of state are fed to the apparatus by providing a toner density sensor 31 in the developing unit 24 and an environmental sensor (in the present embodiment, it is an absolute humidity sensor for detecting the absolute quantity of the moisture in the air) in the vicinity of the developing unit 24 or a toner container which is not shown.

Figure 12:
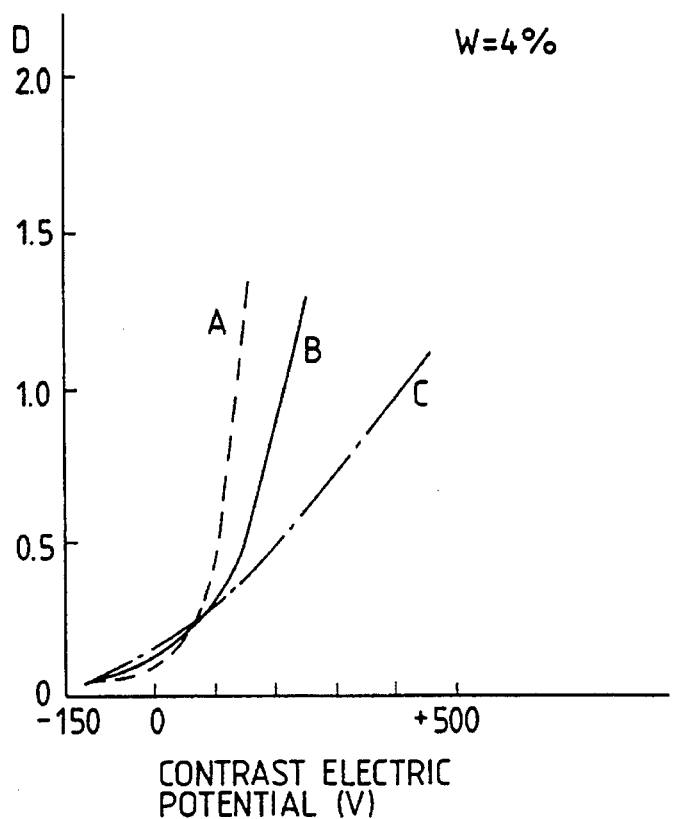
FIG. 12 illustrates an example of the relationship between contrast electric potential and image density.
Figure 13:
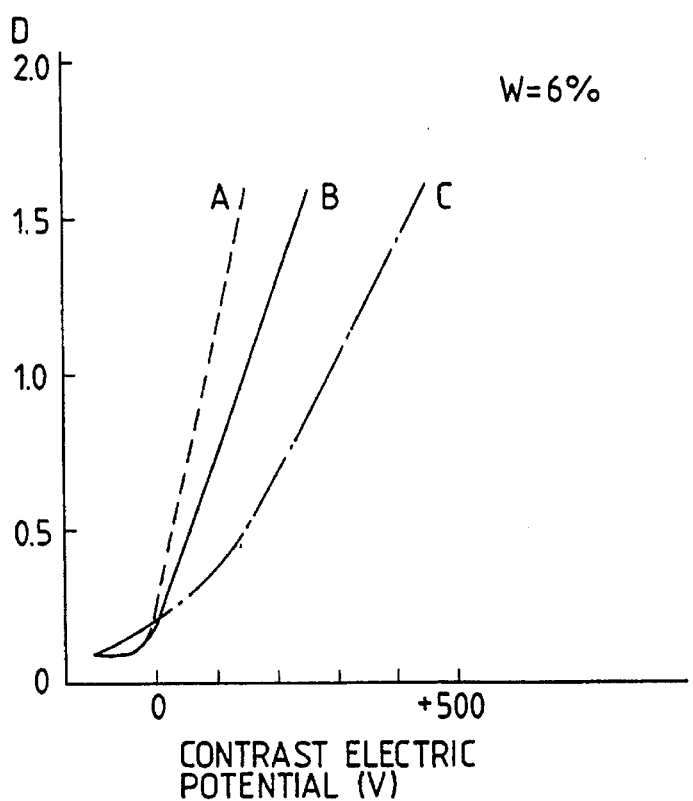
FIG. 13 illustrates another example of the relationship between contrast electric potential and image density.
Figure 14:
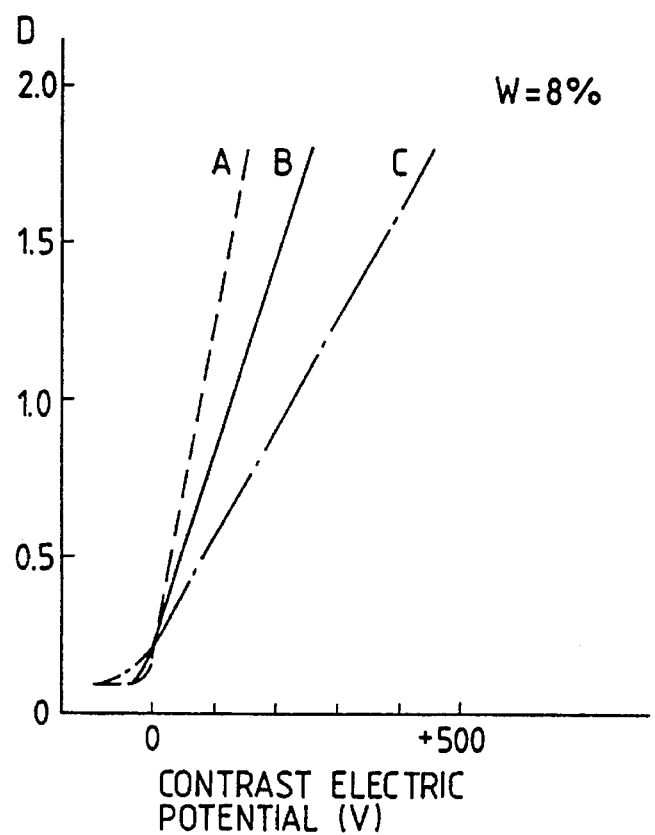
FIG. 14 illustrates still another example of the relationship between contrast electric potential and image density.

FIGS. 12 to 14 illustrate image density and contrast versus the absolute quantity of moisture and toner density where images are formed under the same image forming conditions. In these figures, contrast electric potential is shown along the abscissas. Contrast electric potential will now be described.

Figure 15:
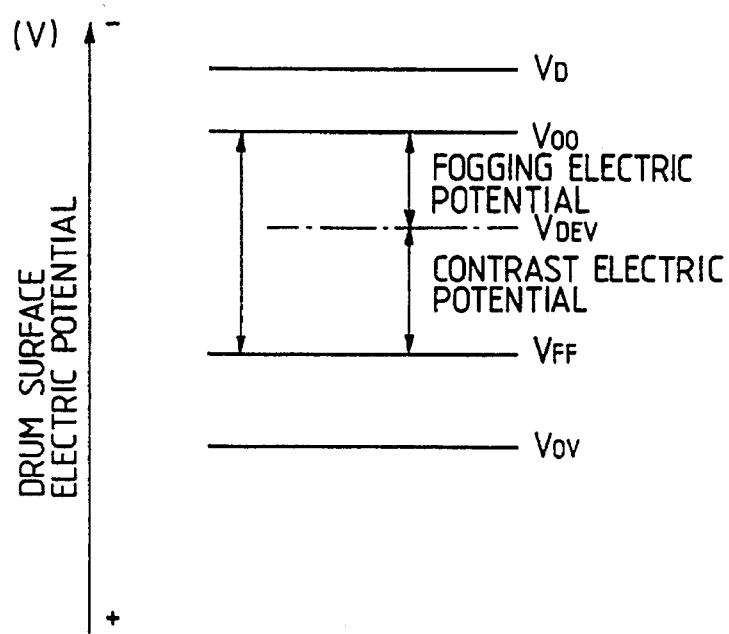
FIG. 15 shows the surface electric potential of a photosensitive drum.

FIG. 15 illustrates the surface electric potential of the photosensitive drum of the electrophotography type printer in the present embodiment.

$V_D$ represents dark area electric potential which is the electric potential of the photosensitive drum irradiated by a laser. $V_{OO}$ represents the surface electric potential of the portions irradiated by the laser beam having the minimum pulse width which correspond to white areas in the images. $V_{FF}$ represents the surface electric potential of the portions irradiated by the laser beam having the maximum pulse width which correspond to black areas in the images. Since the images are processed on an 8-bit basis as described before, the actual electric potential of the photosensitive drum falls in any place in the range from $V_{OO}$ to $V_{FF}$, i.e., 256 levels including $V_{OO}$ and $V_{FF}$. $V_{DEV}$ represents the level of the developing bias applied to a sleeve of the developing unit.

Contrast electric potential (Vcont or cont) as mentioned so far means the difference between the developing bias and the electric potential of black areas and given as follows.

$$\text{vcont} = |V_{DEV} - V_{FF}|$$

In the present embodiment, the difference between $V_{OO}$ and $V_{DEV}$ (fogging prevention electric potential) is always controlled constant.

In FIGS. 12 to 14, A represents data obtained in an environment of a room temperature of 32.5° C. and a relative humidity of 85% (the absolute quantity of the moisture in the air is 26.6 g/Kg-dry air); B represents data obtained in an environment of a room temperature of 23° C. and a relative humidity of 60% (the absolute quantity of the moisture in the air is 10.5 g/Kg-dry air); and C represents data obtained in an environment of a room temperature of 15° C. and a relative humidity of 10% (the absolute quantity of the moisture in the air is 1.1 g/Kg-dry air).

As shown in the figures, under the same image forming conditions, the density decreases as the humidity decreases, and increases as the humidity increases. The reproduction of highlights becomes better as the humidity decreases, and becomes more difficult as the humidity increases.

As previously described, the higher the toner density (w), the greater $D_{max}$. Greater $D_{max}$ values provide clearer and hence more preferable contrast in the final images. However, if the toner density is too high, the toner disperses out of the developing unit. For this reason, the target value for the control of the toner density in the present embodiment is set at 6%.

In order to eliminate the dependence on humidity and toner density and thereby maintain the density and contrast of images constant, the following two operations must be carried out.

(1) to detect humidity and toner density and determine the contrast electric potential corresponding thereto.

(2) to correct contrast with the above-mentioned contrast electric potential and determine a correction coefficient.

Therefore, as the γ-conversion coefficient there are two kinds, i.e., contrast electric potential and contrast correction coefficient.

(1) determination of contrast electric potential

FIGS. 16A to 16C show fuzzy sets which are called membership functions of (1) toner density, (2) two quantities of state of the absolute humidity, and (5)' contrast electric potential. These quantities are classified into several sets. For example, toner density is classified into:

1) TL: Tuner Density Low (Toner density as low.);
2) TM: Toner Density Middle (Toner density is in the middle.); and
3) TH: Toner Density High (Toner density high.). Then, the degree to which a quantity belongs to each set is expressed by a value between 0 and 1. (a) is the membership function of (1). (b) is the membership function of (2). (c) is the membership function of (5)'. TM (Toner density Middle) of (a) will be described as an example. The degree to which toner density of 6% belongs to the set TM is 1.0, and the degree to which toner density of 3% or 9% belongs to the set TM is 0.5. The other quantities are handled in the same manner.

Next, a method of calculating contrast electric potential from the quantities of state of the toner density and absolute humidity will be described.

For example, the following fuzzy rules are used for determining contrast electric potential.

Rule 1 if toner density=TL, and the absolute humidity=HL then, contrast electric potential=V1

Rule 2 if toner density=TL, and the absolute humidity=HM then, contrast electric potential=V2

Rule 3 if toner density=TM, and the absolute humidity=HL then, contrast electric potential=V2

Rule 4 if toner density=TM, and the absolute humidity= HM then, contrast electric potential=V3

As described above, fuzzy rules are set as needed. In this case, there are nine possible fuzzy rules (three classes of toner density X three classes of absolute humidity) as shown in FIG. 17. However, the description will use the above four rules for simplicity.

FIGS. 18A to 19C illustrate an example of the calculation of contrast electric potential using fuzzy inference in accordance with the above (Rule 1)– (Rule 4). As an example, it is assumed that toner density x is 4.2% and the absolute humidity y is 9.6 g/Kg - dry air ).

Figure 18A:
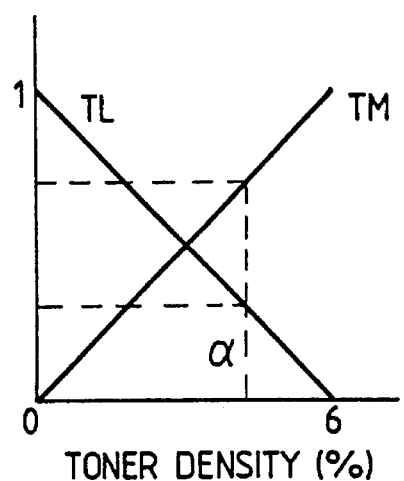
FIGS. 18A to 18D illustrate a part of an example of the procedure for calculating contrast electric potential using fuzzy inference.
Figure 18B:
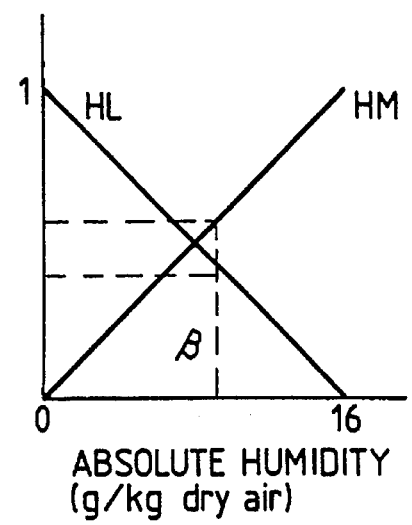
Figure 18C:
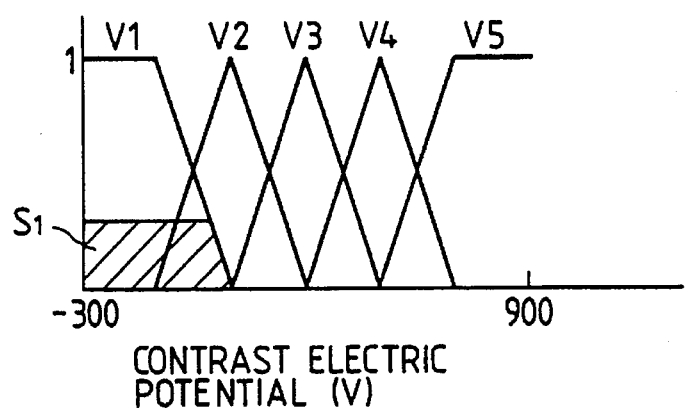
Figure 18D:
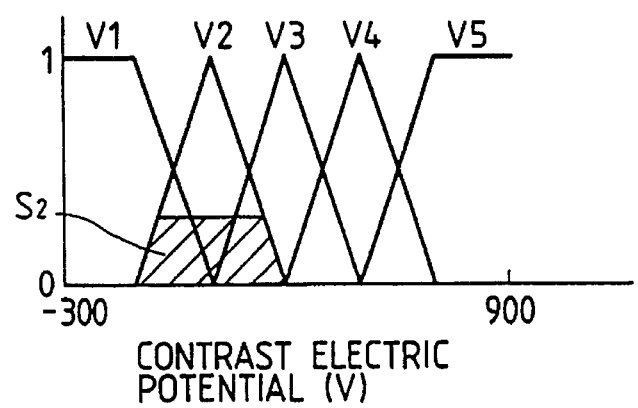

According to the membership function for toner density, the input x (4.2%) is included in the set TL to a degree α (0.3) and, according to the membership function for the absolute humidity, the input y (9.6 g/Kg - dry air)) is included in the set HL to a degree β (0.4). Then, the minimum value of α and β (0.3) is taken as the degree to which the conditional part of Rule 1 is satisfied. If minimum operation is performed on the value and the membership function of contrast electric potential, the trapezoid indicated by the oblique lines at $S_1$ in FIG. 18C is obtained. In FIG. 16C, the trapezoid $S_1$ is obtained by drawing a line in the position of said minimum value (0.3).

Figure 19A:
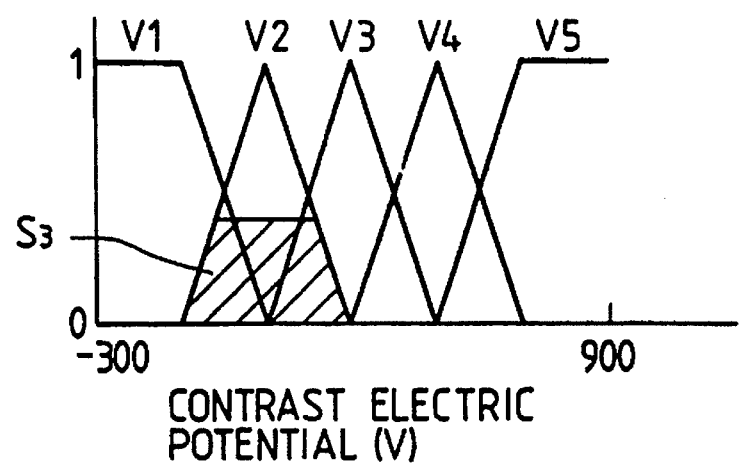
FIGS. 19A to 19C illustrate the remaining parts of the example of the procedure for calculating contrast electric potential using fuzzy inference.
Figure 19B:
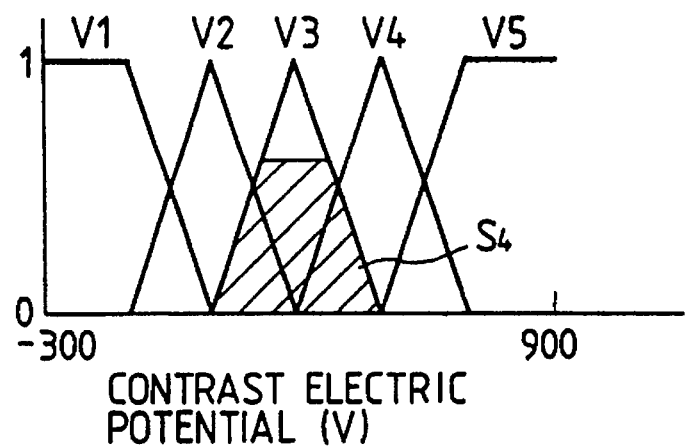
Figure 19C:
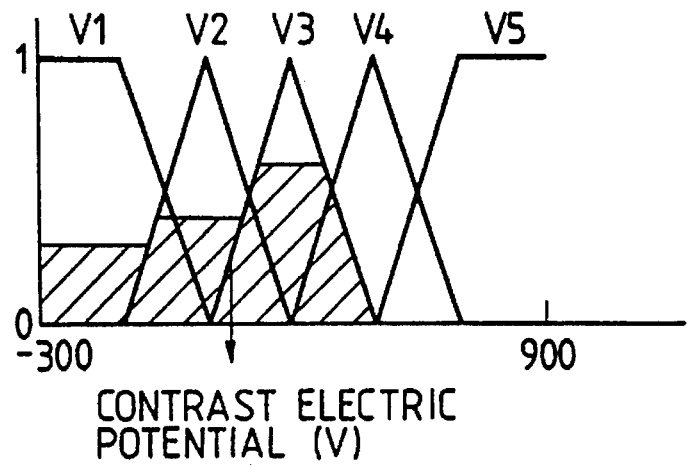

Similar calculation is carried out for (Rule 2)–(Rule 4) to obtain the trapezoids indicated by the oblique lines at $S_2$ (FIG. 18D), $S_3$ (FIG. 19A), and $S_4$ (FIG. 19B). Thereafter, a sum-set U of $S_1$–$S_4$ is obtained. The sum-set U obtained by the above calculation is indicated by the shaded portion in FIG. 19C. The center of gravity of the sum-set U is calculated and the resulting value is taken as the contrast electric potential obtained using the fuzzy inference. For example, according to the above (Rule 1)–(Rule 4), contrast electric potential will be 160 V for the toner density of 4.2% and absolute humidity of 9.6 g/Kg - dry air).

Figure 20:
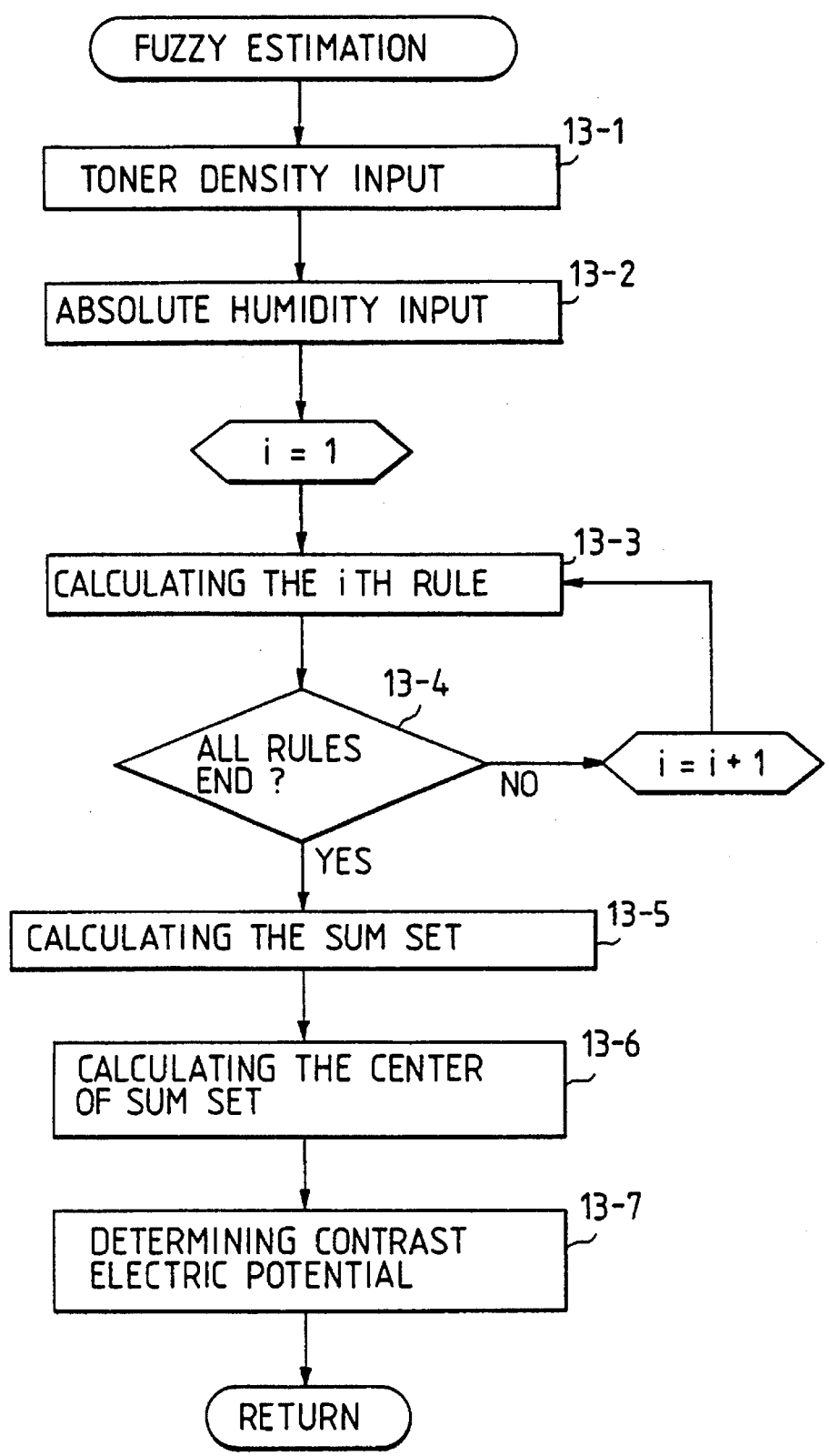
FIG. 20 is a flow chart showing the operation of a fuzzy inference subroutine.

Next, the operational flow of the fuzzy inference subroutine will be discribed with reference to the flow chart in FIG. 20.

First, toner density is measured by the toner density sensor (13-1). At the same time, environmental humidity is detected by the humidity sensor (13-2). Then, the degree to which the quantity of control belongs to the fuzzy set is calculated on the basis of the degrees to which the quantities of state belong to the fuzzy set in accordance with the respective fuzzy rules in the manner as described for the fuzzy rules in FIG. 17 (13-3 and 13-4). The maximum value in the set belonging to each rule is calculated (13-5). The quantity of control having the highest probability is calculated by obtaining the center of gravity (13-6). Then, the center of gravity is taken as contrast electric potential (13-7).

Figure 21:
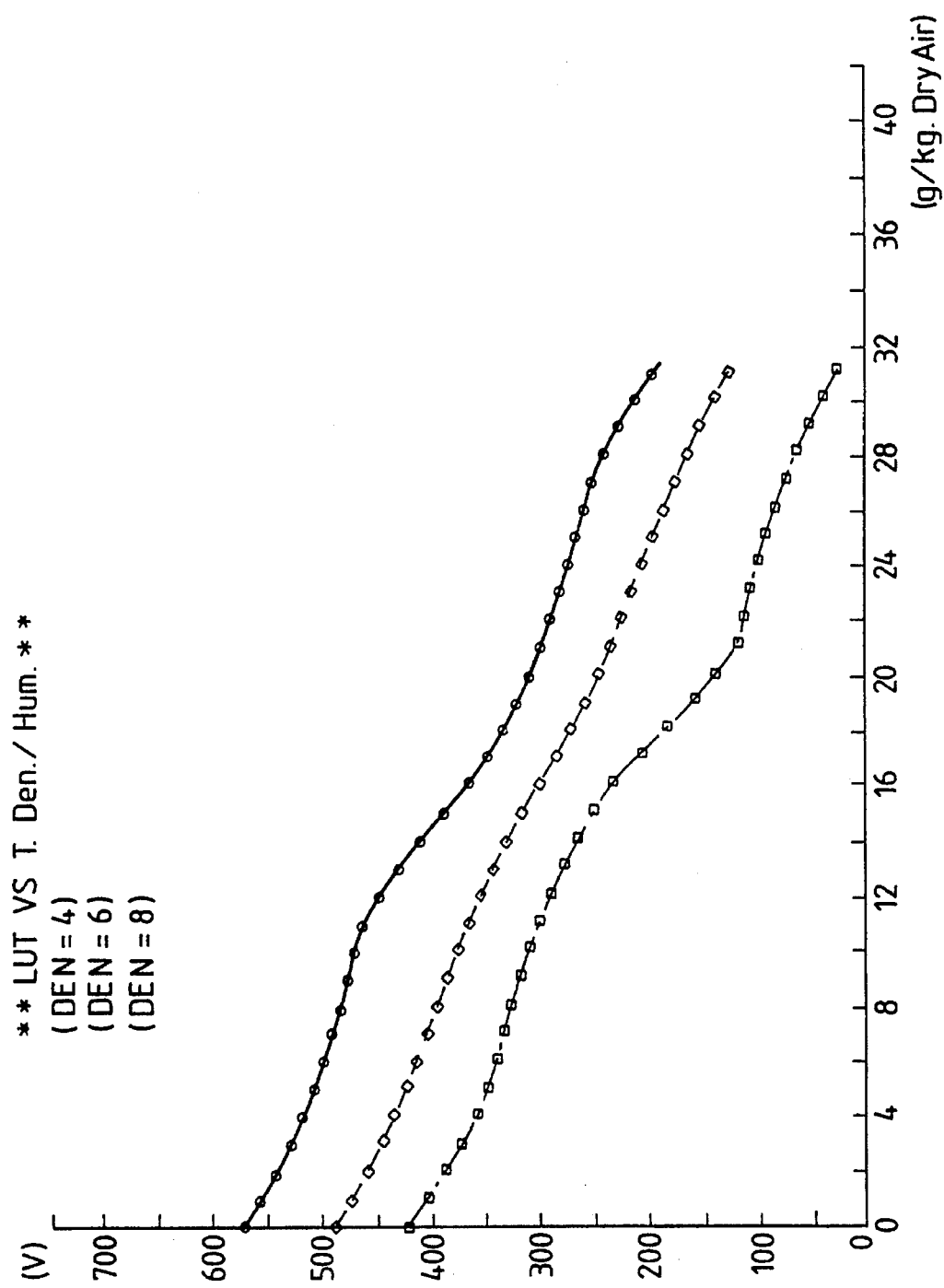
FIG. 21 illustrates the relationship between contrast electric potential and the absolute humidity with respect to toner density.

FIG. 21 illustrates toner density, the ordinate representing contrast electric potential and the abscissa representing the absolute humidity. In the figure, the solid line, dotted line and chain line indicate the cases wherein toner density is 4%, 6% and 8%, respectively.

(2) Determination of Correction Coefficients

Figure 22A:
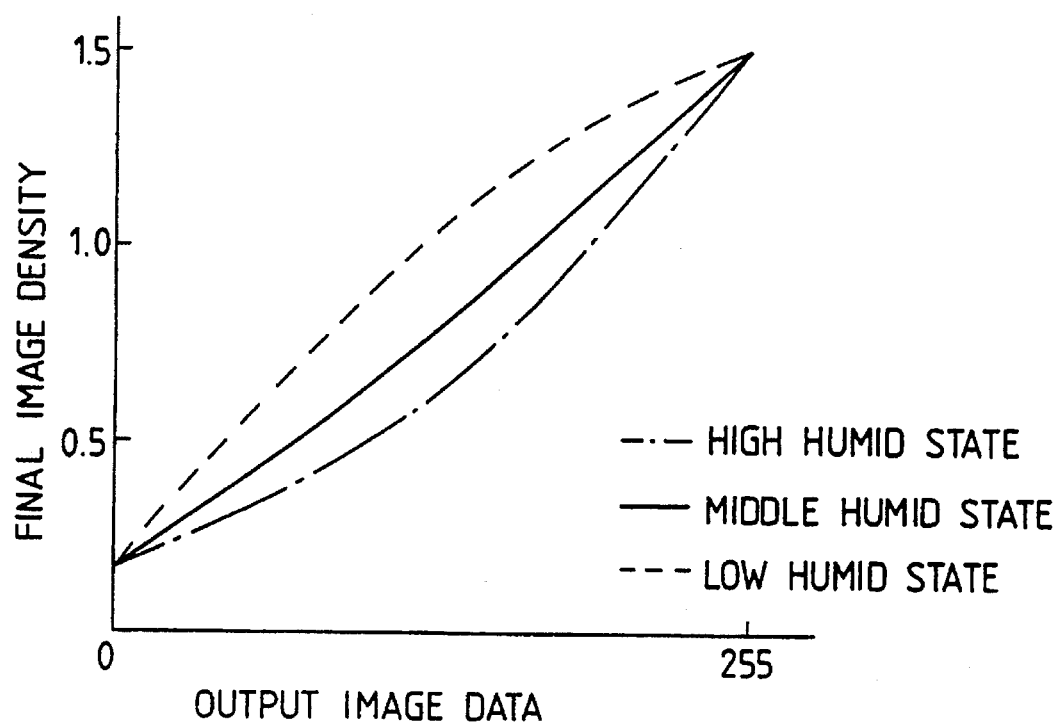
FIGS. 22A and 22B illustrate the relationship between output image data and the final image density in three states.

FIG. 22A illustrates the relationship between the output data and output image density in the case the density of black areas can be controlled by the operation (1) (the control of contrast electric potential ) in three states, i.e., a medium humidity state, low humidity state (low temperature and low humidity state), and high humidity state (high temperature and high humidity state). As shown in the figure, although the density of the black areas (the level 255 in the output image data) is controlled so that the output image density will be 1.5 in all the states, differences in contrast are not corrected. The differences are corrected by the operation (2) which will now be described.

Figure 22B:
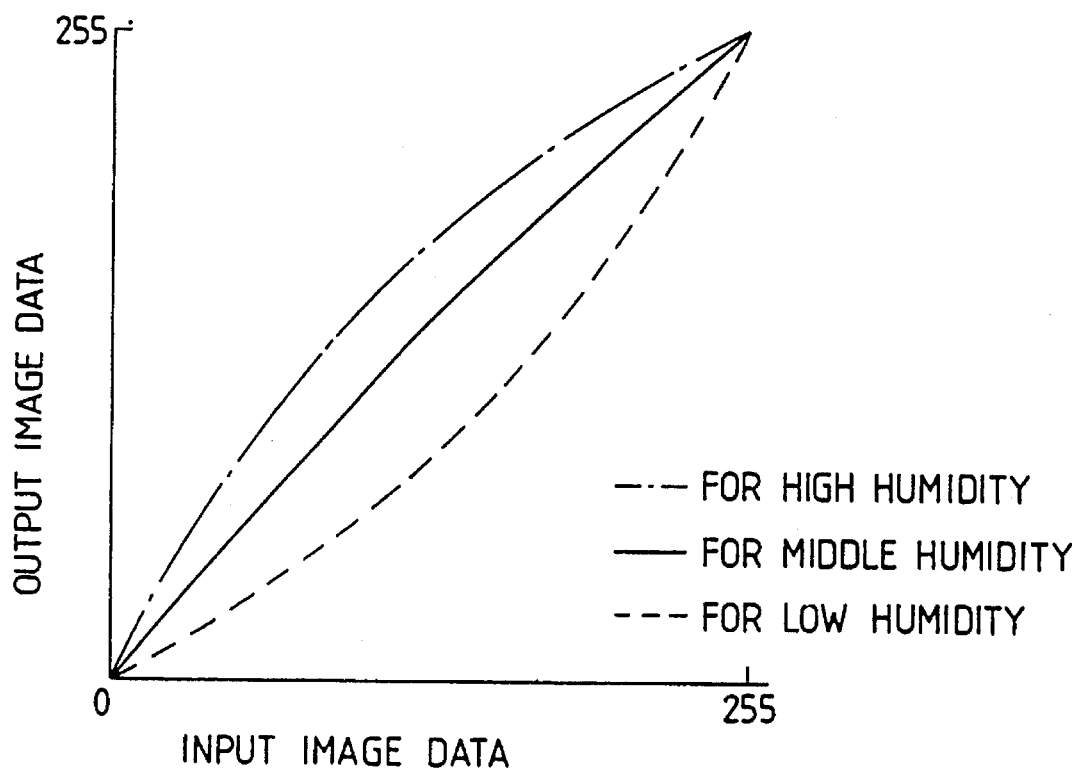

It will be understood from FIG. 22A that γ-correction in each humidity state is preferably carried out as shown in FIG. 22B. As will be easily assumed, FIG. 22B is the inverse function after the density axis of the FIG. 22A is normalized. In the figure, the dotted line, solid line and chain line indicate for low, medium and high humidities, respectively.

Figure 23:
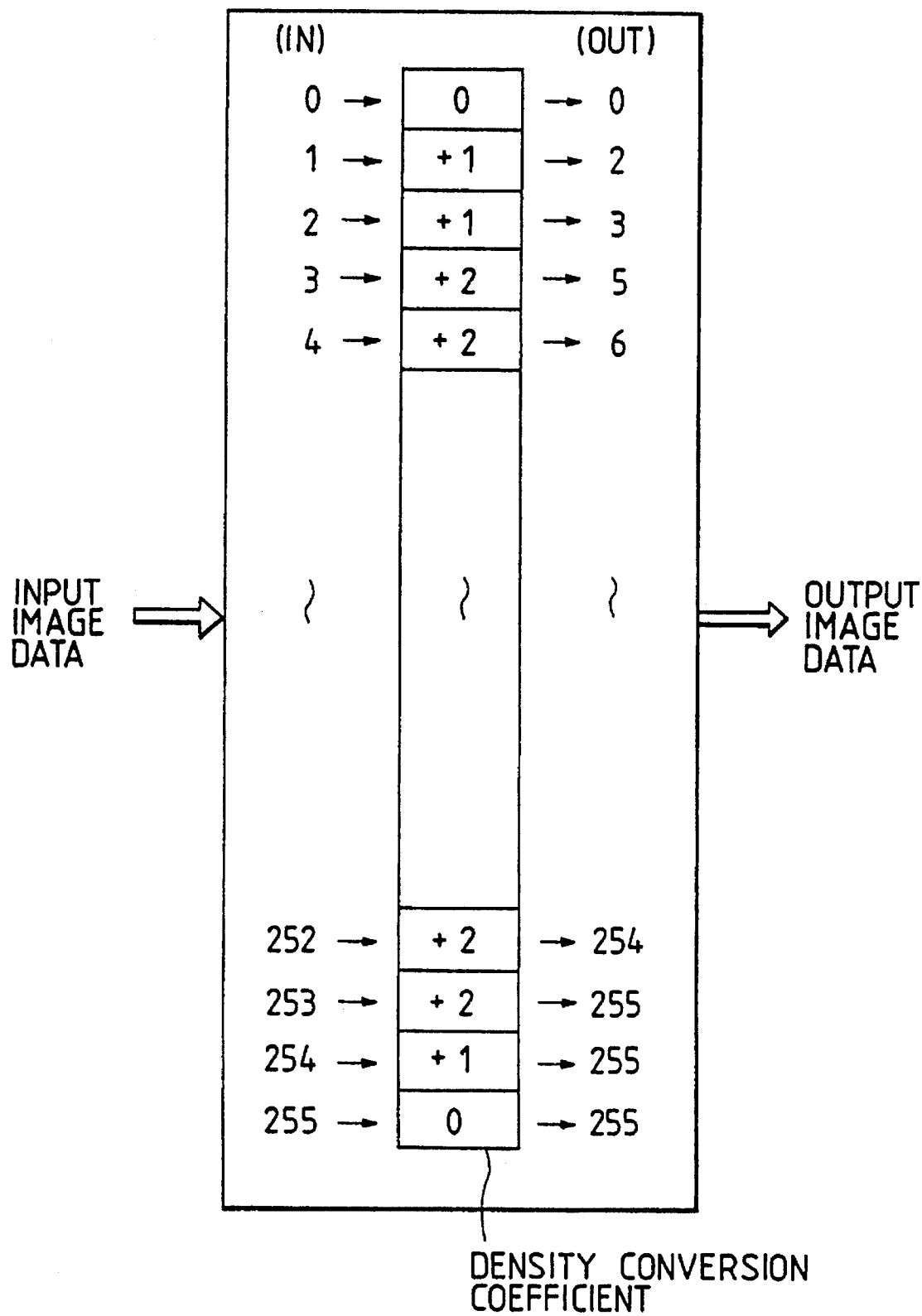
FIG. 23 illustrates the procedure for obtaining output image data from input image data.

The corrections as decribed above are carried out by the corrector 10 shown in FIG. 7. In the γ-corrector, the procedures shown in FIG. 23 are followed in obtaining output image data from input image data. Specifically, output image data is obtained by operating a predetermined density conversion coefficient for each 256-bit input image datum. In the present embodiment, additive operation is carried out.

Figure 26:
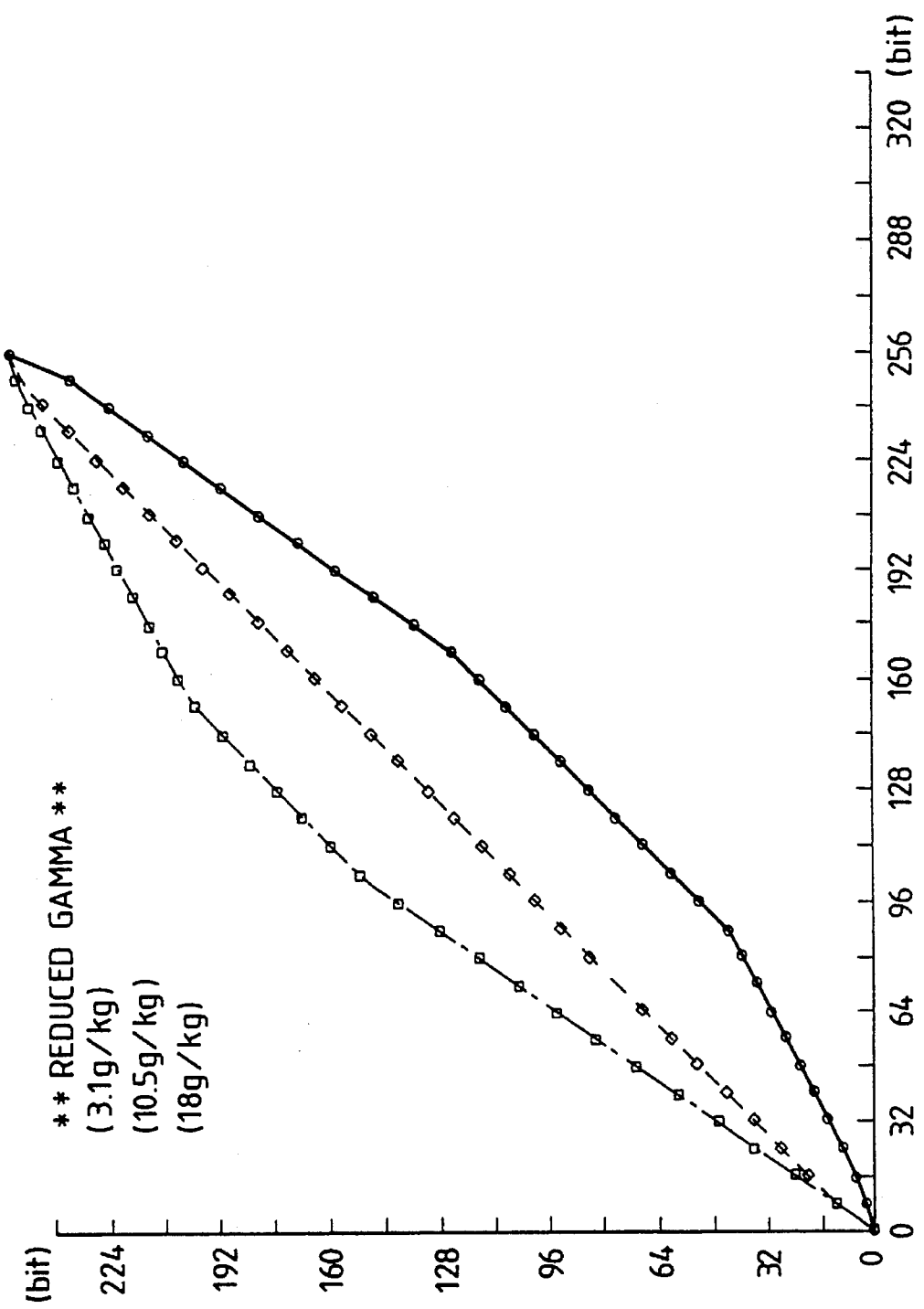
FIG. 26 illustrates output image data.

To determine the above-described density conversion coefficients, control utilizing fuzzy inference is performed just as in the case (1), the determination of contrast electric potential. In this control, (1) the absolute humidity and (2) input image data are used as the quantities of state, and (3) density conversion coefficients are used as the quantities of control. FIGS. 24A to 25 illustrate the membership functions and operational rules for the quantities of state and control (1)–(3). The density conversion coefficients are determined in accordance with the same operational procedures as in the above (1). FIG. 26 illustrates the output image data ultimately obtained using the density conversion coefficients obtained through the above-described operation. In the figure, the solid line indicates a case wherein the absolute humidity is 3.1 g/Kg - dry air; the dotted line indicates a case wherein the absolute humidity is 10.5 g/Kg - dry air; and the chain line indicates a case wherein the absolute humidity is 18 g/Kg - dry air.

Although the γ-correction is performed only on the absolute humidity in the above-described system, more faithfull contrast reproducibility can be achieved by making operational rules involving membership functions for other influential factors just as in the above case (1).

EMBODIMENT 3

Figure 27:
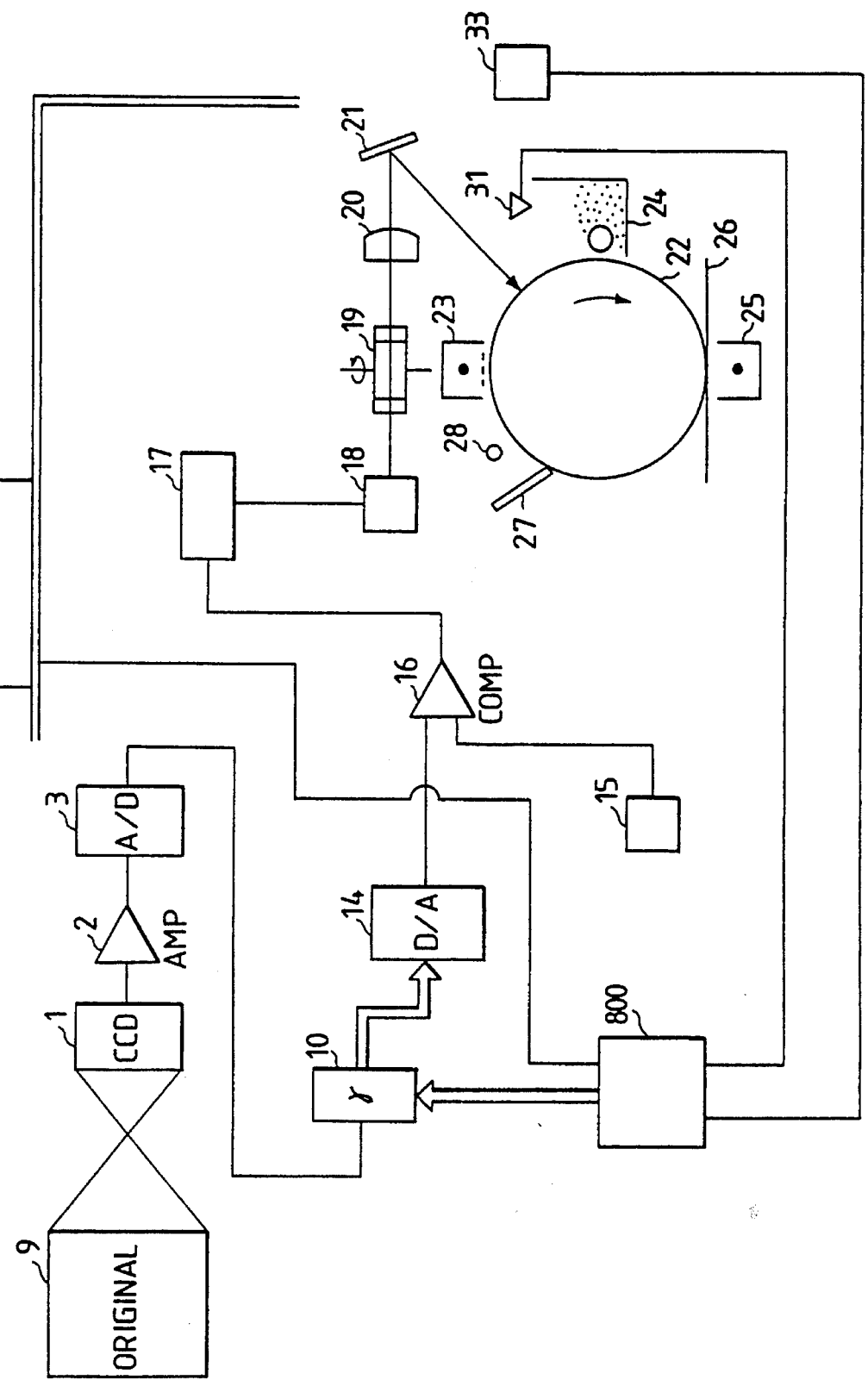
FIG. 27 is a block diagram of a third embodiment of the present invention.

FIG. 27 is a block diagram showing a third embodiment of an image forming apparatus of the present invention wherein the parts corresponding to those in the apparatus of said second embodiment are given identical reference numerals and description will be omitted for them unless it is needed.

Figure 28:
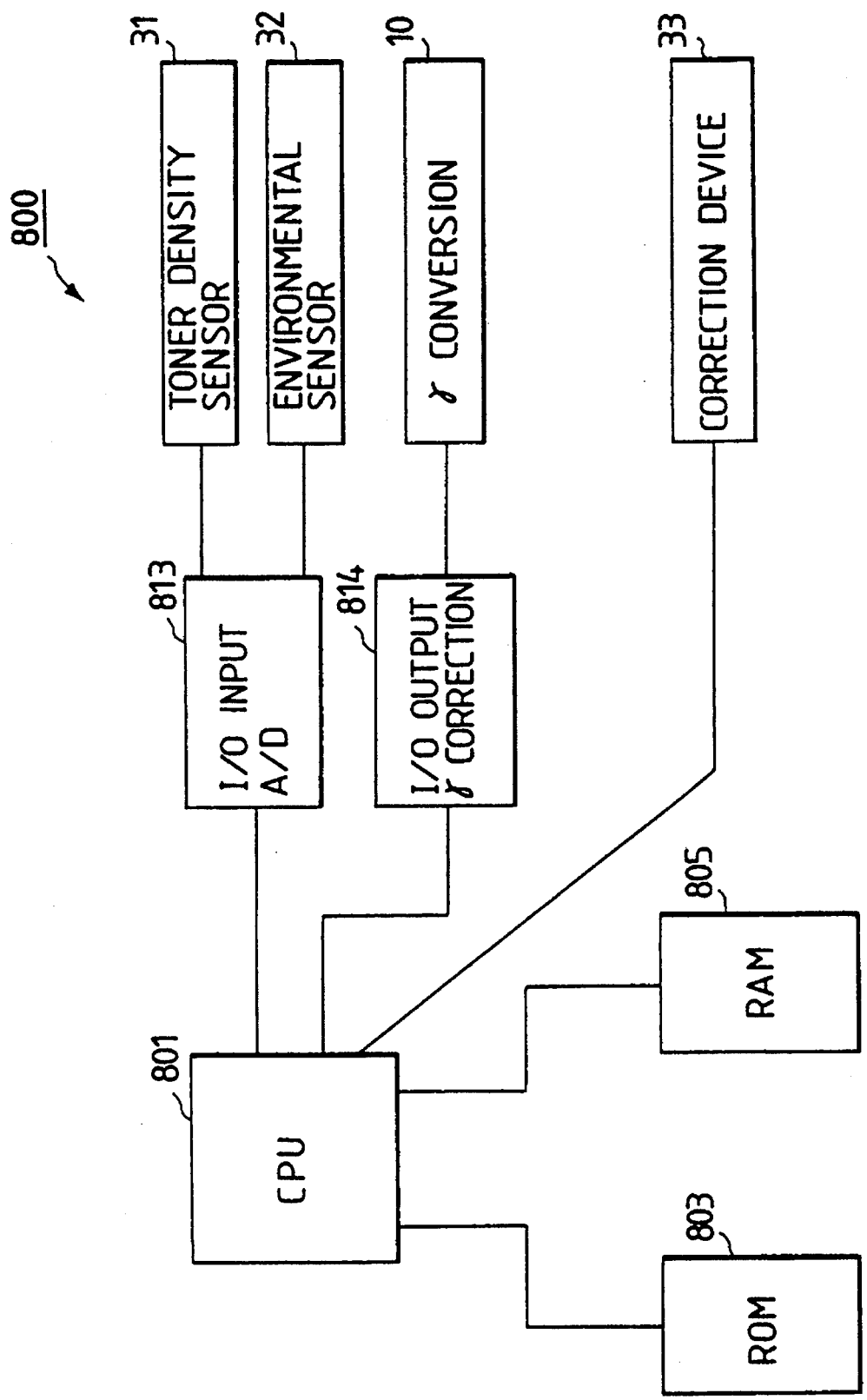
FIG. 28 is a block diagram of a γ-control device in said embodiment.
Figure 29A:
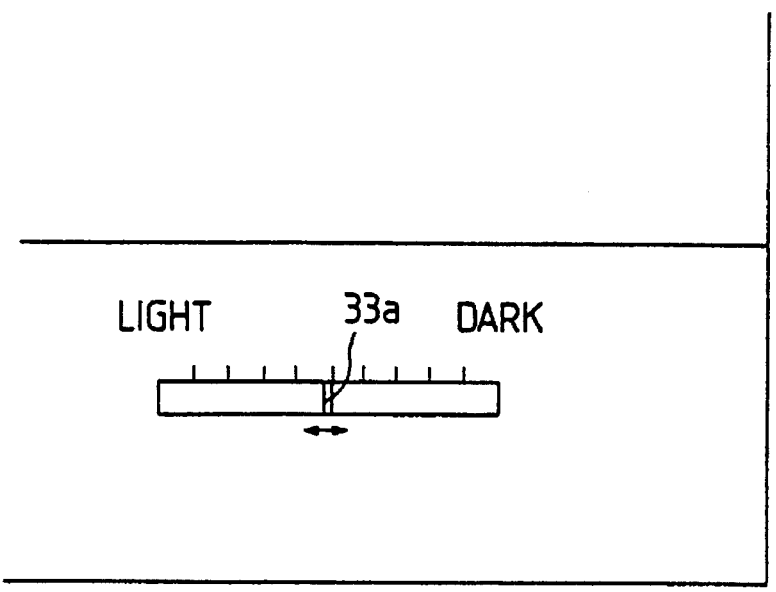
FIG. 29A illustrates a display panel.
Figure 29B:
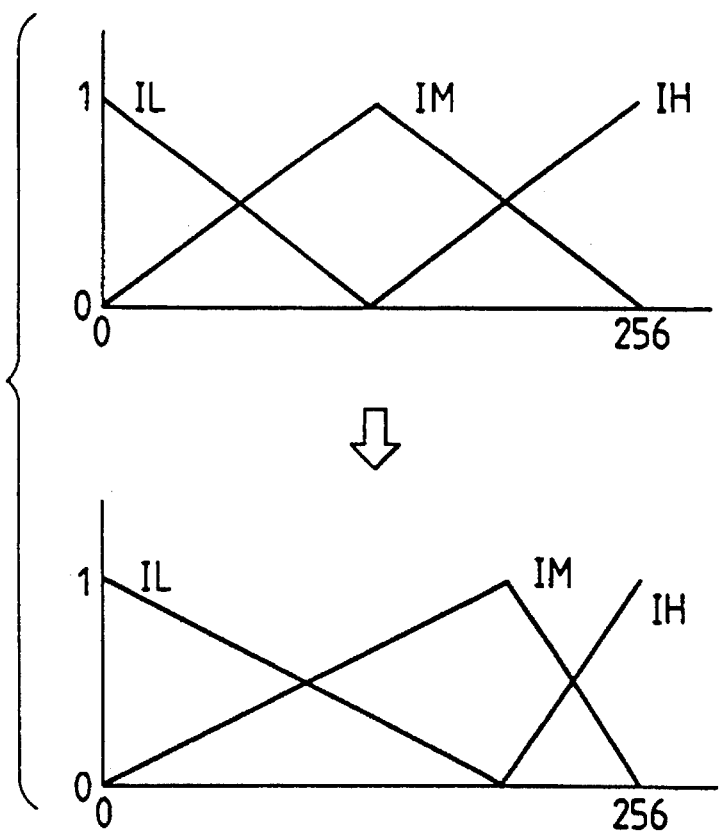
FIG. 29B illustrates a change in the membership function of input data in the γ-control device.
Figure 30:
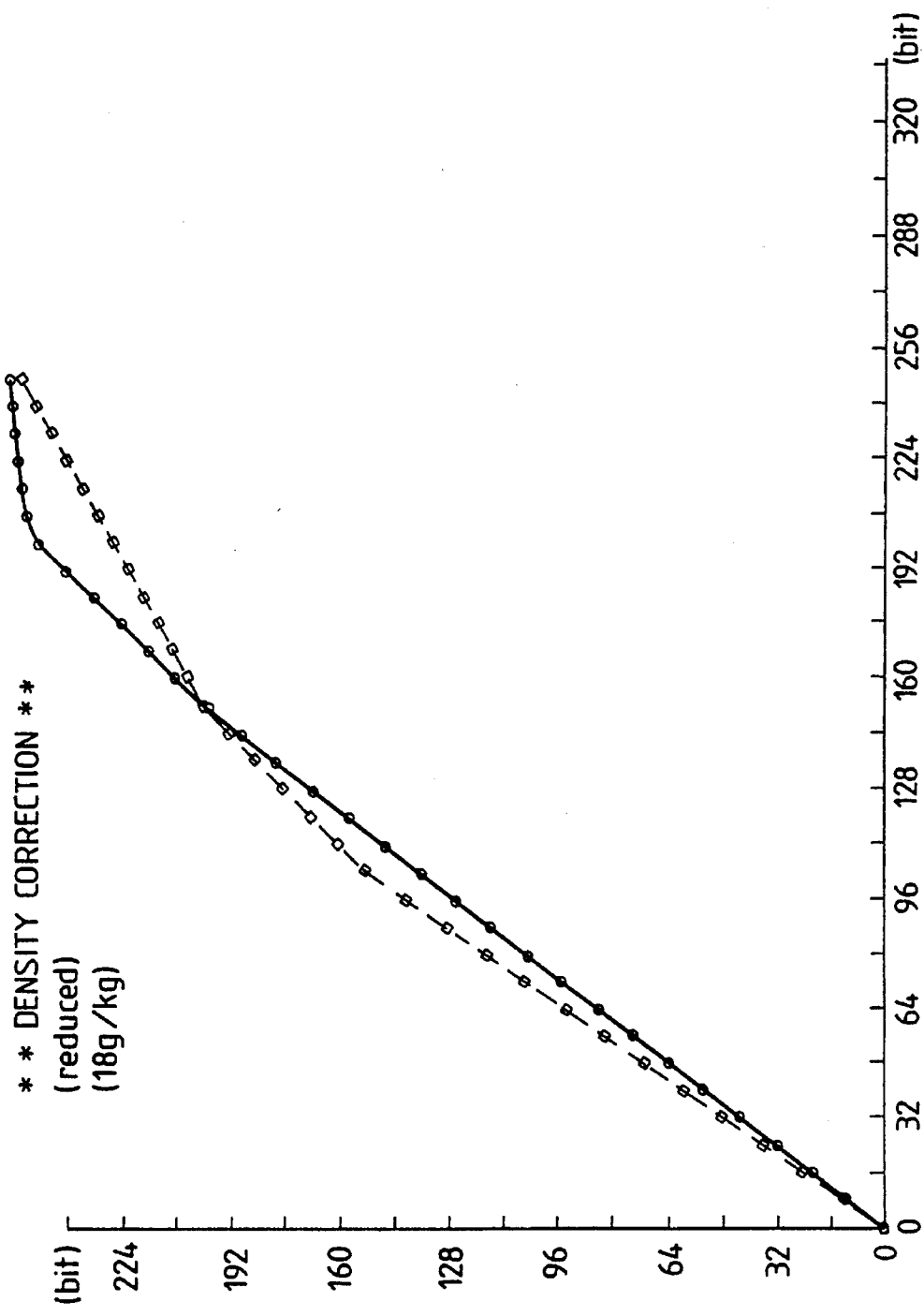
FIG. 30 illustrates the output image data corresponding to the input data.
Figure 31:
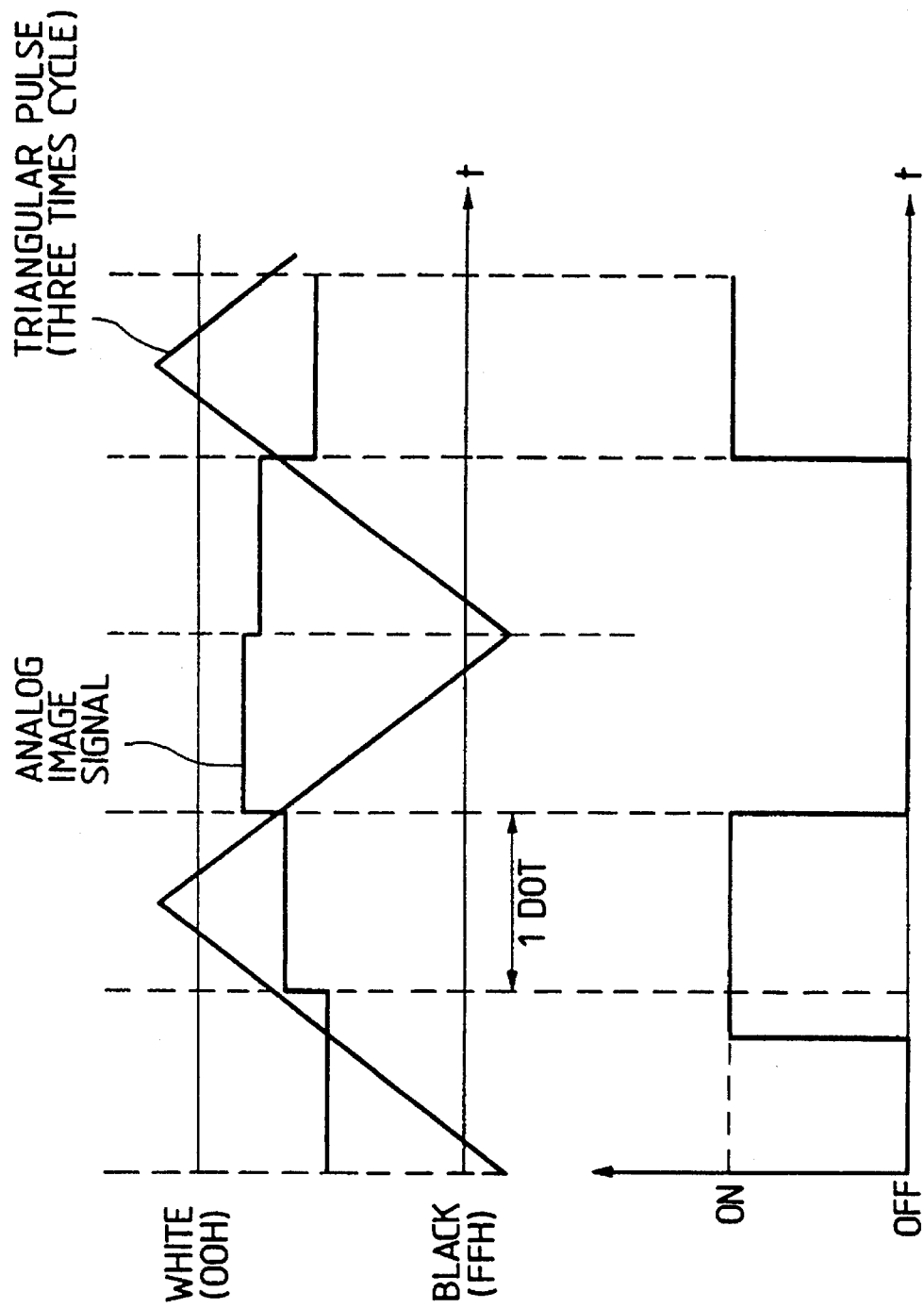
FIG. 31 illustrates a binary signal obtained by pulse width modulation.
Figure 32:
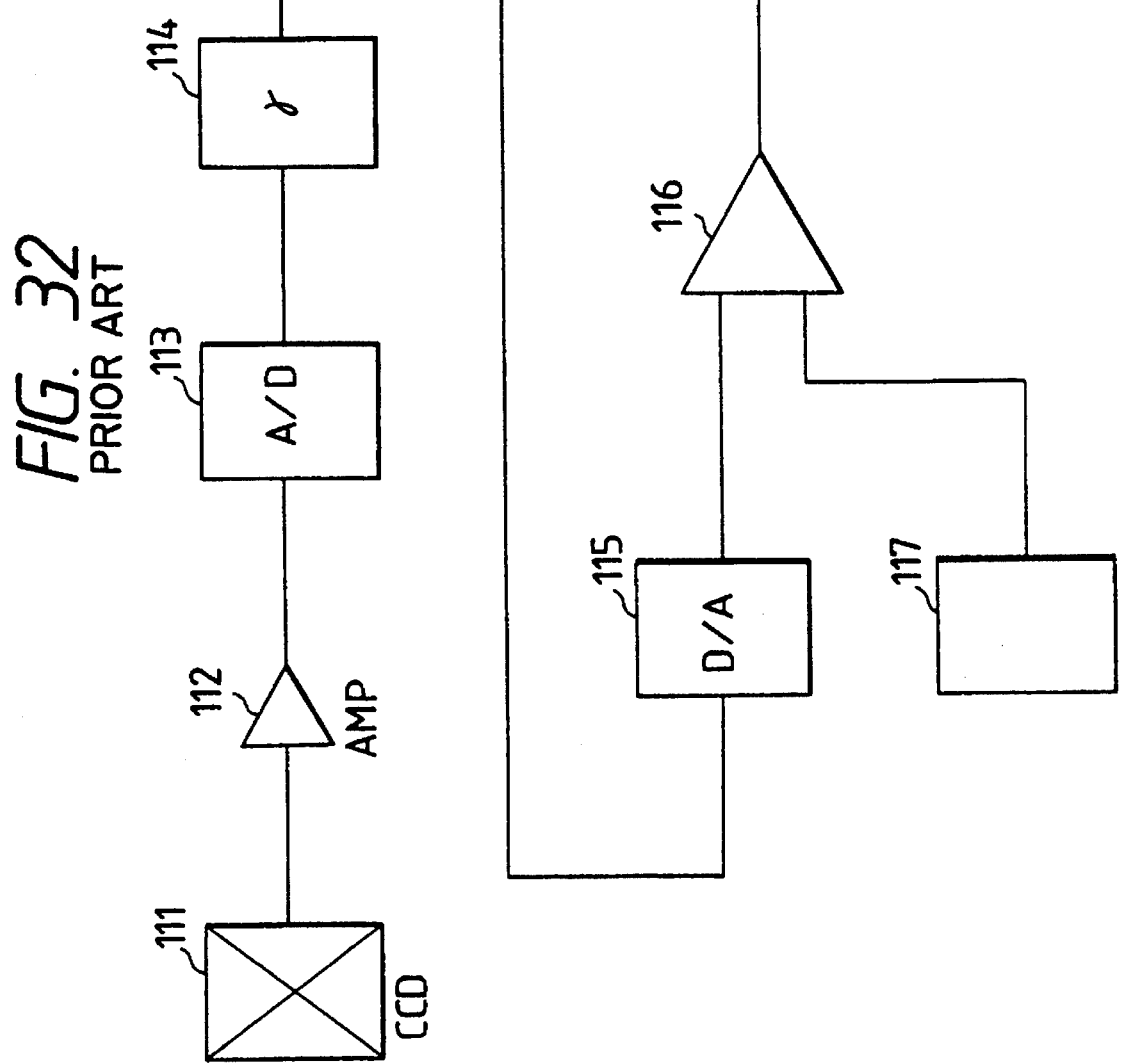
FIG. 32 is a block diagram showing major parts of a conventional image forming apparatus.
Figure 33:
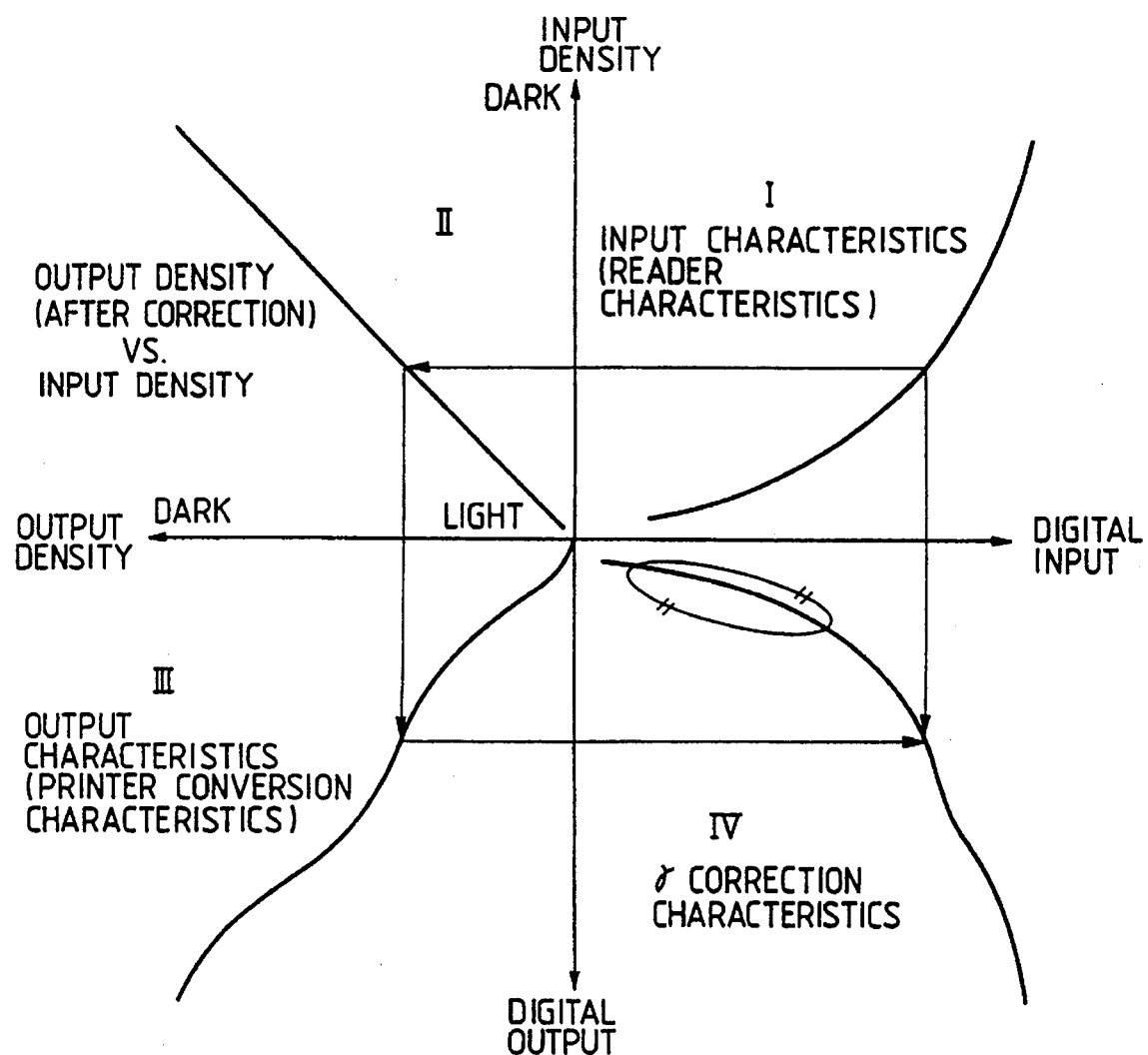
FIG. 33 illustrates typical input/output characteristics of a laser beam printer and an example of a γ-correction table.

In this device, in addition to the configuration of said second embodiment, a correction device 33 for allowing the adjustment of the latent image forming process as preferred by a user, is connected to the γ-control device 800. An example of the operation of the correction device 33 will now be described. FIG. 28 shows an example of the configuration of the γ-control device 800 including the correction device 33. In the present embodiment, the correction device 33 is connected to the central processing unit (CPU) 801 and has a configuration, for example, wherein it is possible to correct the membership functions for the input image data developed during the operational steps. FIG. 29A shows a display panel for a user to perform the image correction. 33a in the figure represents a slide switch which is operated by a user to the left and right as he or she prefers. For example, if it is desired to increase the image density corresponding to the high density side of an original document, the user shifts the slide switch 33a to the right. This causes the membership function for the input image data in the γ-control device 800 to change from the state shown in the upper graph in FIG. 29B to the state shown in the lower graph. Accordingly, the output image data corresponding to this input image data changes as shown in FIG. 30. In the figure, the dotted line indicates the normal mode and the solid line indicates the mode after the correction. This data was taken in the absolute humidity of 18 g/Kg - dry air.

Although the membership function of input image data is corrected in the present embodiment, a similar effect can be obtained by correcting other membership functions.

Further, although the above description has dealt with only the γ-correction, contrast may be corrected instead, and combination of those will be more effective.

EMBODIMENT 4

The effect of the present invention will be further better demonstrated if it is used for a printer which forms multi-valued full-color images using yellow, magenta, cyan and black. Specifically, in the case that density and contrast relative to humidity varies depending on colors, if said image forming conditions are variable depending on the colors, variations in image density and contrast resulting from the differring colors can be corrected and it is possible to realize a printer which maintains constant color balance regardless of environmental changes and the like. Especially, if a correction device for output images are provided as in the second embodiment of the present invention, it is possible to obtain outputs which are not only faithfull to the original but also in accordance with the preference of the user. In this case, it is preferable to provide a slide switch for each color to have a configuration wherein sufficient contrast correction can be made.

As described above, against many quantities of state, appropriate quantities of control (quantities of correction) can be quickly and effectively obtained without using a memory of a large capacity.

The present invention is not limited by the above-described embodiments and various modifications can be made without departing from the scope as defined in the appended claims.

What is claimed is:

1. An image forming apparatus for forming images on a recording medium comprising:

an electrophotographic printer engine for forming images having a plurality of colors;

detection means for quantitatively detecting a state of devices of the image forming apparatus relating to image formation;

control means for setting quantities of control for each color of said electrophotographic printer engine based on the detected state of each of the devices of the image forming apparatus;

calculation means for determining, based on the quantities of state detected by said detection means, quantities of control using fuzzy sets, and for calculating quantities of control to be set by the control means for each color, each quantity of control corresponding to one of the detected quantities of state from a degree to which the quantity of state belongs to each fuzzy set; and an extraction means for extracting, in accordance with predetermined rules, a main quantity of control by which the control means sets the amount of each color in a specific position within the area represented by each quantity of control calculated by said calculation means.

2. An image forming apparatus according to claim 1, wherein said detection means detects at least any of the environment around the apparatus, the quantity and direction of the change in said environment, the average humidity in unit time, the toner/carrier ratio of the developer.

3. An image forming apparatus according to claim 1, wherein the target to be controlled by said control means is at least any of the control electric potential of an electrostatic latent image forming means, the charge electric potential of the developer, and the toner/carrier ratio of the developer.

4. An image forming apparatus according to claim 1, wherein said extraction means extracts the position of the center of gravity of area covered by each of the quantities of control calculated by said calculation means.

5. An image forming apparatus comprising:

input means for inputting image signals;

signal processing means for processing said image signals;

image formation processing means for performing image formation in accordance with the image signals processed by said signal processing means;

obtaining means for obtaining processing conditions for said image formation processing means; and inference means for inferring quantities of control for processing the image signal by said signal processing means based on the processing conditions obtained by said obtaining means and based on processing parameters using fuzzy logic.

6. An image forming apparatus according to claim 5, wherein said obtaining means detects the environmental temperature as a processing condition.

7. An image forming apparatus according to claim 5, wherein said obtaining means detects the number of the sheets on which said image formation processing means forms images as a processing condition.

8. An image forming apparatus according to claim 5, wherein said obtaining means obtaines the type of the recording papers on which images are formed as a processing condition.

9. An image forming apparatus according to claim 5, wherein said obtaining means obtains the type of the colorant used by said image forming means as a processing condition.

10. An image forming apparatus according to claim 5, wherein said signal processing means has a γ-conversion means for converting γ-characteristics of input image data and said inference means obtains conversion characteristics of γ-conversion means.

11. An image forming apparatus according to claim 10, further comprising an adjusting means for allowing said γ-conversion characteristics to be manually corrected.

12. An image forming apparatus according to claim 5, wherein said image formation processing means forms images in a plurality of colors.

13. An image forming apparatus according to claim 5, wherein said image formation processing means is a processing means of an electrophotography system.

14. An image forming apparatus according to claim 13, wherein said image forming means uses a laser beam as a light source for exposure.

15. An image forming apparatus comprising:

image forming means for forming an image;

control means for controlling a density of the image formed by said image forming means;

manual designating means for manually designating a density characteristic of the image to be formed by said image forming means;

quantity-of-state detecting means for detecting at least one quantity of state of said image forming means;

inference means for obtaining, in accordance with a fuzzy rule and the detected quantity of state, a quantity of control of said control means; and correcting means for correcting said fuzzy rule in accordance with the density characteristic designated by said manual designating means.

16. An apparatus according to claim 15, wherein said image forming means is an electrophotographic engine having:

an image-carrying element;

means for forming a latent image on said image-carrying element;

developing means for developing the latent image formed on said image-carrying element; and toner image processing means for performing a process of transferring the image formed on said image-carrying element onto a transfer material.

17. An apparatus according to claim 15, wherein said correcting means corrects a membership function of the fuzzy rule.

18. An apparatus according to claim 15, wherein said manual designating means designates a brightness of the image to be formed.

19. An apparatus according to claim 15, wherein said manual designating means designates a contrast of the image to be formed.

20. An apparatus according to claim 15, wherein said image forming means forms an image based on an image signal, and said control means controls a gamma characteristic of the image signal.

21. An image forming method for forming images by using an electrophotographic printer, comprising the steps of:

quantitatively detecting a state of devices of the electrophotographic printer relating to image formation;

setting quantities of control for each color of the electrophotographic printer based on the detected state;

determining, based on quantities of state detected in said detecting step, the quantities of control using fuzzy sets;

calculating the quantities of control to be set in said setting step for each color, each quantity of control corresponding to one of the detected quantities of state from a degree to which the quantity of state belongs to each fuzzy set; and extracting, in accordance with predetermined rules, a main quantity of control by which said setting step sets an amount of each color in a specific position within an area represented by each quantity of control calculated in said determining step and calculating step.

22. An image forming method using a printer, comprising the steps of:

inputting image signals;

processing the image signals;

obtaining processing conditions of the printer;

inferring quantities of control for processing in said processing step based on the processing conditions obtained in said obtaining step and based on processing parameters using fuzzy logic; and outputting the image signal processed in said processing step.

23. An image forming method using a printing engine, comprising the steps of:

controlling a density of an image reproduced by the printing engine;

manually designating a density characteristic of the image to be reproduced by the printing engine;

detecting at least one quantity of state of the printer;

obtaining a quantity of control in said controlling step in accordance with a fuzzy rule and the detected quantity of state; and correcting the fuzzy rule in accordance with the density characteristic designated in said manually designating step.

* * * * *

UNITED STATES PATENT AND TRADEMARK OFFICE
CERTIFICATE OF CORRECTION

PATENT NO. : 5,465,111
DATED : November 7, 1995
INVENTOR(S) : Hisashi Fukushima, et. al.

It is certified that error appears in the above-indentified patent and that said Letters Patent is hereby corrected as shown below:

COLUMN 7

Line 17, "bids" should read --bias--.

COLUMN 8

Line 46, "IIH" should read --HH-- and "he" should read --the--; and
Table 1, "IIH" should read --HH--.

COLUMN 9

Line 58, "at " should read --as--.

COLUMN 14

Line 21, "Tuner" should read --Toner-- and "as" should read --is--.

Signed and Sealed this

Ninth Day of April, 1996

Attest:

BRUCE LEHMAN

*Attesting Officer*     Commissioner of Patents and Trademarks